(12) United States Patent
Sezginer

(10) Patent No.: US 7,266,800 B2
(45) Date of Patent: Sep. 4, 2007

(54) METHOD AND SYSTEM FOR DESIGNING MANUFACTURABLE PATTERNS THAT ACCOUNT FOR THE PATTERN- AND POSITION-DEPENDENT NATURE OF PATTERNING PROCESSES

(75) Inventor: Abdurrahman Sezginer, Los Gatos, CA (US)

(73) Assignee: Invarium, Inc., San Jose, CA (US)

( * ) Notice: Subject to any disclaimer, the term of this patent is extended or adjusted under 35 U.S.C. 154(b) by 308 days.

(21) Appl. No.: 10/861,170

(22) Filed: Jun. 4, 2004

(65) Prior Publication Data

US 2005/0273753 A1    Dec. 8, 2005

(51) Int. Cl.
G06F 17/50    (2006.01)

(52) U.S. Cl. .............................. 716/21; 716/19; 716/4

(58) Field of Classification Search ................. 716/21, 716/19, 4
See application file for complete search history.

(56) References Cited

U.S. PATENT DOCUMENTS

| | | | | |
|---|---|---|---|---|
| 5,308,991 | A | 5/1994 | Kaplan | 430/5 |
| 5,528,508 | A | 6/1996 | Russell et al. | 716/8 |
| 5,573,890 | A | 11/1996 | Spence | 430/311 |
| 5,705,301 | A | 1/1998 | Garza et al. | 430/5 |
| 5,858,580 | A | 1/1999 | Wang et al. | 430/5 |
| 5,862,058 | A | 1/1999 | Samuels et al. | 716/21 |
| 5,888,675 | A | 3/1999 | Moore et al. | 430/5 |
| 5,978,085 | A | 11/1999 | Smith et al. | 356/521 |
| 6,048,651 | A | 4/2000 | Brunner et al. | 430/5 |
| 6,091,486 | A | 7/2000 | Kirk | 356/124 |
| 6,130,747 | A | 10/2000 | Nomura et al. | 356/239.2 |
| 6,269,472 | B1 | 7/2001 | Garza et al. | 716/21 |
| 6,289,499 | B1 | 9/2001 | Rieger et al. | 716/21 |
| 6,303,251 | B1 | 10/2001 | Mukai et al. | 430/5 |
| 6,311,319 | B1 | 10/2001 | Tu et al. | 716/19 |
| 6,356,345 | B1 | 3/2002 | McArthur et al. | 356/121 |
| 6,396,569 | B2 | 5/2002 | Zheng et al. | 355/77 |
| 6,403,477 | B1 | 6/2002 | Tounai | 438/669 |
| 6,413,683 | B1 | 7/2002 | Liebmann et al. | 430/5 |
| 6,430,737 | B1 | 8/2002 | Cobb et al. | 716/19 |
| 6,444,373 | B1 | 9/2002 | Subramanian et al. | 430/5 |
| 6,453,452 | B1 | 9/2002 | Chang et al. | 716/19 |
| 6,453,457 | B1 | 9/2002 | Pierrat et al. | 716/19 |

(Continued)

FOREIGN PATENT DOCUMENTS

GB    2375403    11/2003

OTHER PUBLICATIONS

"Correcting Design Data for Manufacture," U.S. Appl. No. 10/860,852, filed Jun. 4, 2004, inventors: Vishnu Kamat.

(Continued)

*Primary Examiner*—Sun James Lin
(74) *Attorney, Agent, or Firm*—Smith-Hill and Bedell

(57) ABSTRACT

Computational models of a patterning process are described. Any one of these computational models can be implemented as computer-readable program code embodied in computer-readable media. The embodiments described herein explain techniques that can be used to adjust parameters of these models according to measurements, as well as how predictions made from these models can be used to correct lithography data. Corrected lithography data can be used to manufacture a device, such as an integrated circuit.

49 Claims, 21 Drawing Sheets
(10 of 21 Drawing Sheet(s) Filed in Color)

U.S. PATENT DOCUMENTS

| | | | |
|---|---|---|---|
| 6,470,489 B1 | 10/2002 | Chang et al. | 716/21 |
| 6,529,623 B1 | 3/2003 | Kent | 382/149 |
| 6,532,585 B1 | 3/2003 | Petranovic et al. | 716/19 |
| 6,553,559 B2 | 4/2003 | Liebmann et al. | 716/19 |
| 6,584,609 B1 | 6/2003 | Pierrat et al. | 716/19 |
| 6,646,729 B2 | 11/2003 | van der Laan et al. | 356/124 |
| 6,686,100 B2 | 2/2004 | Martin et al. | 430/5 |
| 2002/0088951 A1* | 7/2002 | Chen | 250/548 |
| 2002/0091986 A1 | 7/2002 | Ferguson et al. | 716/19 |
| 2002/0138810 A1 | 9/2002 | Lavin et al. | 716/1 |
| 2003/0003385 A1 | 1/2003 | Martin | 430/30 |
| 2003/0088847 A1 | 5/2003 | Chang et al. | 716/19 |
| 2003/0098970 A1 | 5/2003 | Chen | 356/124 |
| 2003/0121021 A1 | 6/2003 | Liu et al. | 716/19 |
| 2003/0192013 A1 | 10/2003 | Cote et al. | 716/2 |
| 2003/0192025 A1 | 10/2003 | Liu | 716/19 |
| 2004/0015794 A1* | 1/2004 | Kotani et al. | 716/4 |

OTHER PUBLICATIONS

"Method of Characterizing Flare," Invarium, Inc. U.S. Appl. No. 10/860,853, filed Jun. 4, 2004, inventors: Bo Wu, Abdurrahman Sezginer.

"Method for Characterization of the Illuminator in a Lithographic System," U.S. Appl. No. 10/960,357, filed Oct. 6, 2004, inventors: Franz X. Zach, Bo Wu, and Abdurrahman Sezginer.

"System and Method for Compensating for Aberrations in a Photolithographic Process," U.S. Appl. No. 10/841,025, filed May 7, 2004, inventor: Roy V. Prasad.

"System and Method for Reducing Patterning Variability in Integrated Circuit Manufacturing through Mask Layout Corrections," U.S. Appl. No. 10/841,079, filed May 7, 2004, inventors: Roy V. Prasad, Chi-Song Horng, Ram S. Ramanujam.

"Method and System for Designing Manufacturable Patterns that Account for the Pattern- and Position-Dependent Nature of Patterning Processes," U.S. Appl. No. 10/861,170, filed Jun. 4, 2004, inventor: Abdurrahman Sezinger.

"Characterizing Flare of a Projection Lens," U.S. Appl. No. 10/933,090, filed Sep. 1, 2004, inventors: Bo Wu, Abdurrahman Sezginer, Franz X. Zach.

"Method for Correcting Position-Dependent Distortions," U. S. Appl. No. 10/933,192, filed Aug. 31, 2004, inventors: Devendra Joshi, Abdurrahman Sezginer, Franz X. Zach.

A. K-T Wong, Resolution enhancement techniques in optical lithography, SPIE Press, vol. TT47, Bellingham, WA, pp. 91-115, 2001.

H. J. Levinson, Principles of Lithography, SPIE Press, Bellingham, WA, pp. 257-283 and 771-802, 2001.

Abramowitz, M. and Stegun, I. A. (Eds.), Ch. 22, Handbook of Mathematical Functions with Formulas, Graphs, and Mathematical Tables, 9th printing. New York: Dover, pp. 771-802, 1972.

Born, M. and Wolf, E., Principles of Optics, Ch. 9, 6th ed. New York: Pergamon Press, pp. 459-490 and 523-527, 1989.

C. Bodendorf, et al., Impact of measured pupil illumination fill distribution on lithography simulation and OPC models, Proc. SPIE vol. 5377, Article 110, 2004.

G. McIntyre et al., "Characterizing illumination angular uniformity with phase shifting masks," Proc. SPIE vol. 5040, Article 16, 2003, SPIE Bellingham WA.

C. Mack, "Inside PROLITH: A Comprehensive Guide to Optical Lithography Simulation," pp. 67-112, 1997, Finle Technologies, Austin, TX.

Robertson et al., "An Improved Notch Model for Resist Dissolution in Lithography Simulation," SPIE vol. 4345, 9 pages (undated).

D. G. Flagello, "Theory of high-NA imaging in homogeneous thin films," Optical Society of America, A, vol. 13, No. 1, 1996.

E. Luce et al., "Flare impact on the intrafield CD control for sub-0.25 um patterning," SPIE vol. 3679, p. 368-381, Mar. 1999.

Gill, P. R.; Murray, W.; and Wright, M. H. "The Levenberg-Marquardt Method," §4.7.3 in Pratical Optimization. London: Academic Press, pp. 136-137, 1981.

Golub, G. H. and Van Loan, C. F., Matrix Computations, Sect. 2.5.3 and 2.5.6, 3rd ed. Baltimore, MD: Johns Hopkins University Press, 1996.

Granik, "Dry etch proximity modeling in mask fabrication," Yuri Publication: Proc. SPIE vol. 5130, p. 86-91, Photomask and Next-Generation Lithography Mask Technology X; Hiroyoshi Tanabe; Ed. (Aug. 2003).

H. Nomura et al., "Higher order aberration measurement with printed patterns under extremely reduced σ illumination," Proc. SPIE vol. 3679, p. 358-367, SPIE, Bellingham, WA, 1999.

J.P. Kirk et al., "Application of blazed gratings for determination of equivalent primary azimuthal aberrations," Proc. SPIE vol. 3679, p. 70-76, 1999.

J. P. Cain, "Characterization of Spatial Variation in Photolithography," M.S. thesis, University of California, Berkeley, 2002.

J.A. Kong, Electromagnetic Wave Theory, John Wiley & Sons, 2nd Ed., pp. 370-403, 1990.

J.M. Geary, Introduction to Wavefront Sensors, vol. TT18, SPIE Optical Engineering Press, Bellingham, WA, pp. 53-103, 1995.

J.P. Kirk, "Scattered light in photolithographic lenses," Proc SPIE 2197, p. 566-572, SPIE, Bellingham, WA, 1994.

Kirkpatrick, S., C. D. Gelatt Jr., M. P. Vecchi, "Optimization by Simulated Annealing," Science, 220, No. 4598, pp. 671-680, 1983.

Koza, J. R., "Genetic Programming: On the Programming of Computers by Means of Natural Selection," Cambridge, MA: MIT Press, 1992.

M. Terry et al., "Behavior of lens aberrations as a function of wavelength on KrF and ArF lithography scanners," Proc. SPIE vol. 4346, p. 15-24, 2001.

Mark van der Kerkof, et al, "Full optical column characterization of DUV lithographic projection tools," SPIE 29th Annual International Symposium on MicroLithography, paper 5377, Article 212, Feb. 22-27, 2004, Santa Clara, CA.

Metropolis, N., A. Rosenbluth, A. Teller, E. Teller, "Equation of State Calculations by Fast Computing Machines," J. Chem. Phys., 21, 6, 1087-1092, 1953.

Nomura, "New Phase shift gratings for measuring aberrations," Proc. SPIE vol. 4346, p. 25-35, 2001.

P. Dirksen et al., "Determination of resist parameters using the extended Nijboer-Zernike theory," Proc. SPIE vol. 5377, Article 13, SPIE, Bellingham, 2004.

Press, W. H.; Flannery, B. P.; Teukolsky, S. A.; and Vetterling, W. T. "Interpolation and Extrapolation." Ch. 3 in Numerical Recipes in FORTRAN: The Art of Scientific Computing, 2nd ed. Cambridge, England: Cambridge University Press, pp. 99-122, 1992.

Schneider et al. "Compensation of long-range process effects on photomasks by design data correction," Proc. SPIE vol. 5148, p. 179-188, 19th European Conference on Mask Technology for Integrated Circuits and Microcomponents; Jun. 2003.

T. Brunner et al., "Impact of resist blur on MEF, OPC, and CD control," Proc. SPIE 5377, SPIE Bellingham, WA, 2004.

J.P. Stirniman, M.L. Rieger, "Fast proximity correction with zone sampling," Proc. SPIE, vol. 2197, pp. 294-301, 1994.

Nicolas Bailey Cobb, "Fast Optical and Process Proximity Correction algorithms for integrated circuit manufacturing," Ph.D. Thesis, Univ. of Calif., 123 pages, 1998.

Frank M. Schellenberg, "Resolution Enhancement with OPC/PSM," Future Fab Intl., vol. 9, Jan. 2000.

Haolin Zhang, "Causal Analysis of Systematic Spatial Variation in Optical Lithography," Ph.D. Thesis, Univ. of Calif., Berkeley, 14 pages, Jun. 2002.

Jason P. Cain and Costas J. Spanos, "Electrical linewidth metrology for systematic CD variation characterization and casual analysis," Proc. SPIE, vol. 5038, pp. 350-361, 2003.

Liebmann, "Layout Impact of Resolution Enhancement Techniques: Impediment or Opportunity?," ISPD '03, Monterey, CA, pp. 110-117, Apr. 2003.

"Litel Instruments—ISI Product Overview," http://litel.net.isi_product.htm, 2 pages, printed Jan. 26, 2004.

"The MEEF Meter': a Realistic Approach for Lithography Process Monitoring," Yield Management Solutions, pp. 52-57 (Aug. 2000).

Granik et al., "New Process Models for OPC at sub-90nm Nodes," Deep Submicron Technical Publications, presented at SPIE 2003, 11 pages, May 2003.

Wojcik et al., "Laser Alignment Modeling Using Rigorous Numerical Simulations," SPIE vol. 1463 Optical/Laser Microlithography IV, pp. 292-303, 1991.

J. P. Kirk et al. "Pupil Illumination; in situ measurement of partial coherence", Proc. SPIE vol. 3334, 1998, p. 281-288.

F. Zach et al. "Aberration Analysis using Reconstructed Aerial images of Isolated Contacts on Attenuated Phase shift masks."

P. Dirksen et al, "Characterization of a Projection Lens Using the Extended Nijboer-Zernike Approach," Proc. SPIE vol. 4691 (2002), p. 1392.

N. Cobb et al., "Mathematical and CAD Framework for Proximity Correction," Proceedings of the SPIE, vol. 2726 (1996), p. 208.

T. A. Brunner, "Approximate Models for Resist Processing Effects," SPIE vol. 2726 (1996), p. 198.

J. Schacht et al., "Calibration of OPC models for multiple focus conditions," Proc. SPIE. vol. 5377 (2004), p. 691-702.

Born and Wolf, "Principles of Optics," Cambridge University Press, 7th edition, pp. 459-490, 1999.

N. Cobb, "Fast Optical and Process Proximity Correction Algorithms for Integrated Circuit Manufacturing," Ph.D. Thesis, University of California, Berkeley, 1998.

A. Rosenbluth et al., "Fast Calculation of Images for High Numerical Aperture Lithography," Proceedings of the SPIE vol. 5377 (2004), p. 615.

F. Zach, "Neural Network Based Approach to Resist Modeling and OPC," Proceedings of the SPIE, vol. 5377 (2004) p. 670.

Robertson et al, "An Improved Notch Model for Resist Dissolution in Lithography Simulation," Proc. SPIE vol. 4345 (2001), p. 912.

F. Zach et al, "Aberration Analysis Using Reconstructed Aerial Images of Isolated Contacts on Attenuated Phase Shift Masks," Proc. SPIE vol. 4346 (2001), p. 1362.

Erdmann et al, "Comparison of Simulation Approaches for Chemically Amplified Resists," Proc. SPIE vol. 4404 (2001), p. 99.

Dirksen et al., "Novel Aberration Monitor for Optical Lithography," Proc. SPIE vol. 3679 (1999), p. 77.

Erdmann et al., "Comparison of Simulation Approaches for Chemically Amplified Resists," SPIE vol. 4404, 12 pages. (2001) p. 99.

* cited by examiner

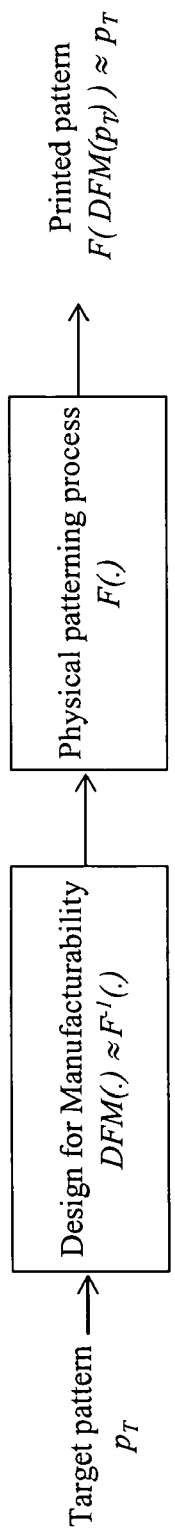
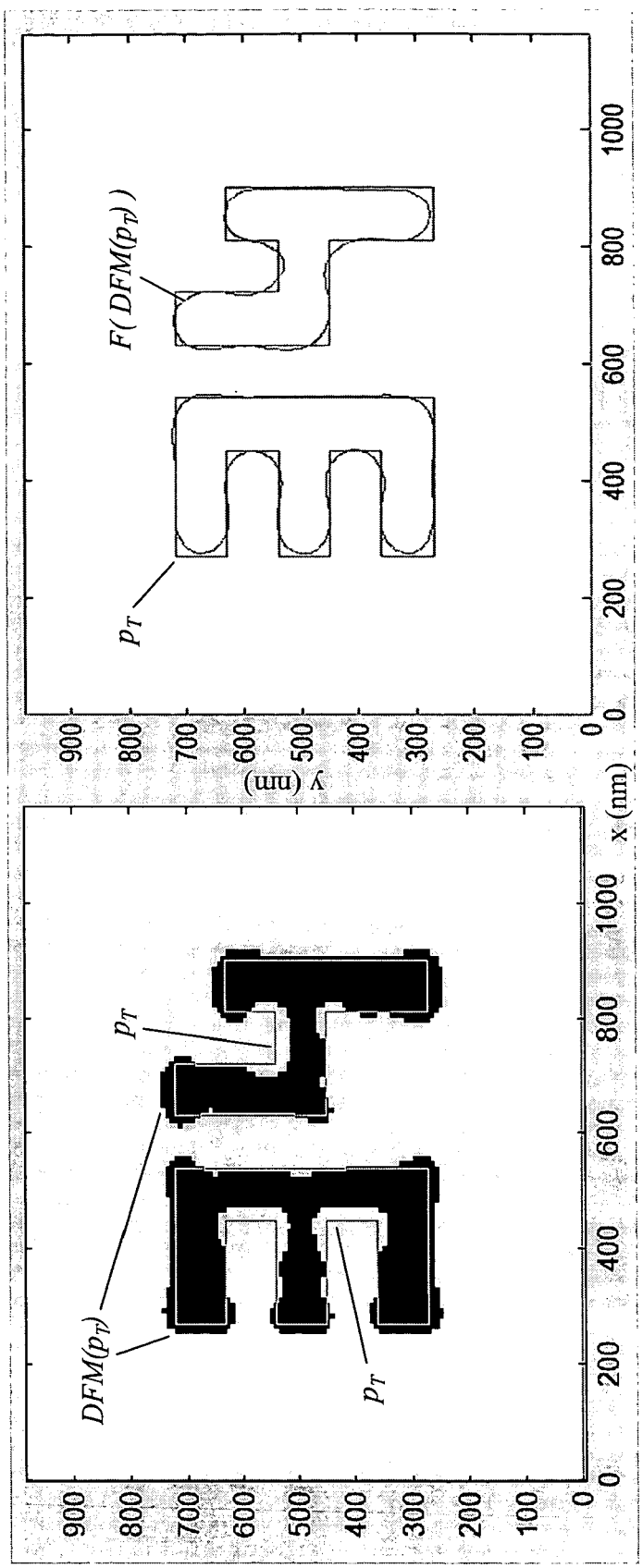
Figure 1d
Figure 1e

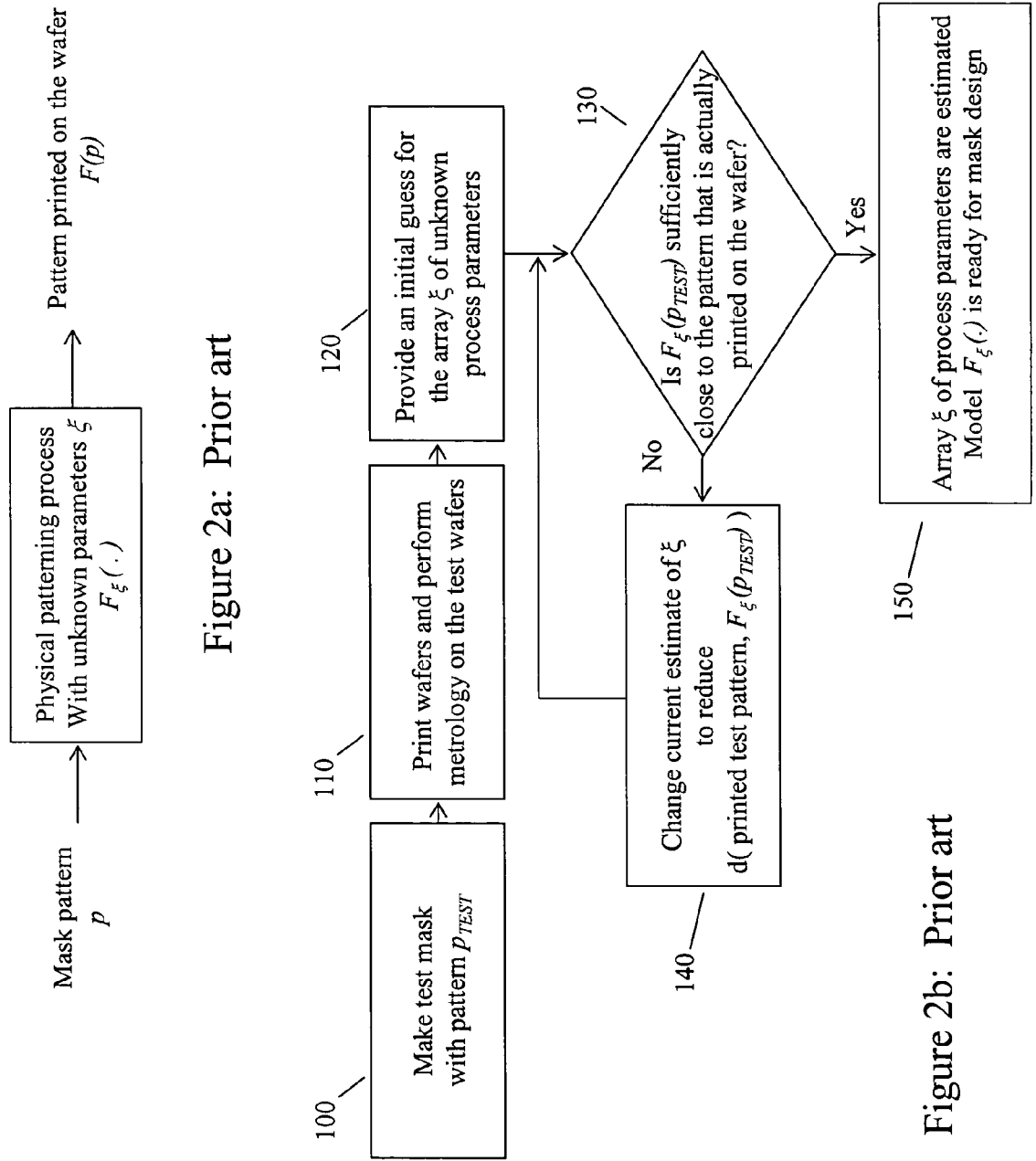
Figure 2a: Prior art
Figure 2b: Prior art

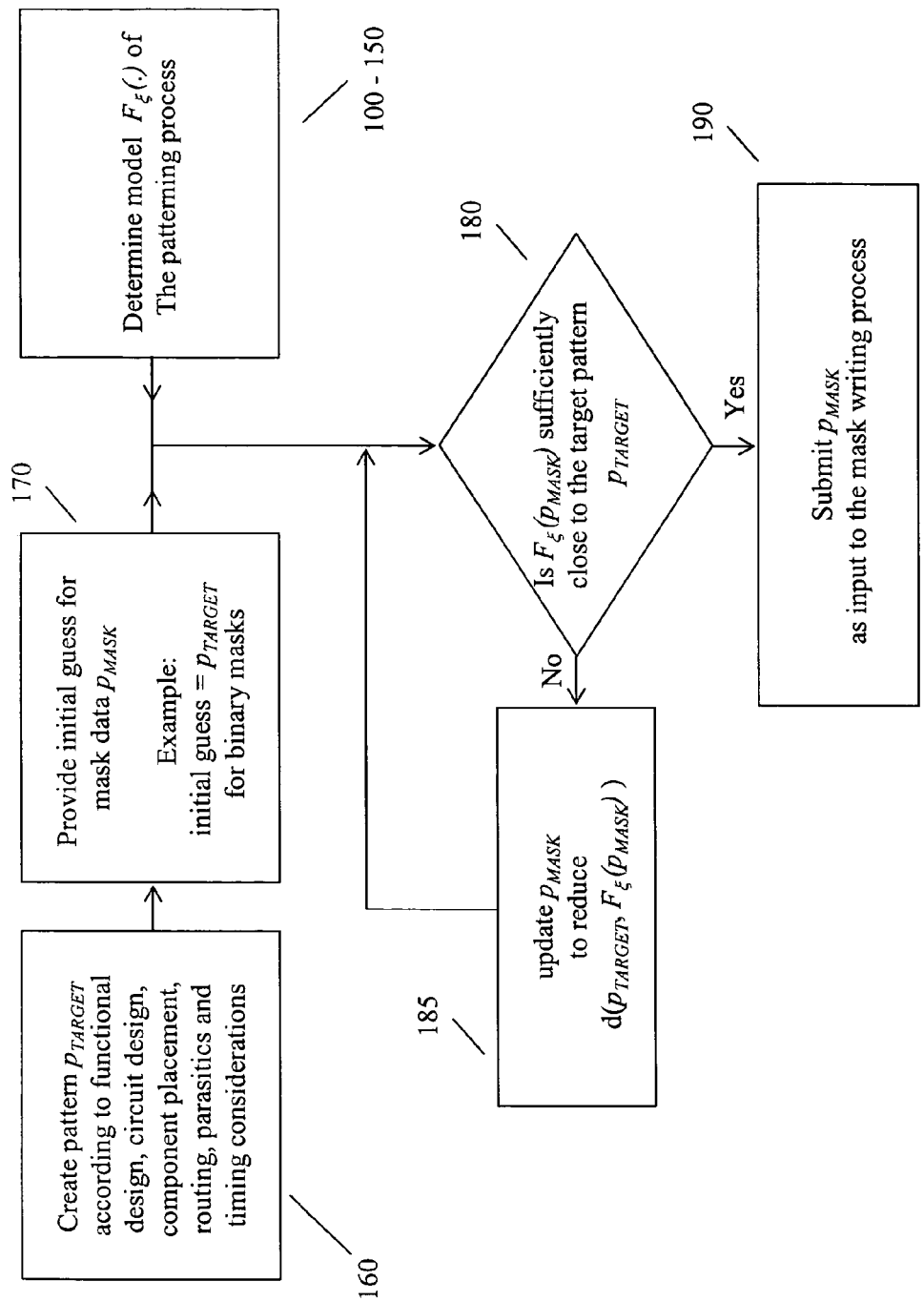
Figure 2c: Prior art

METHOD AND SYSTEM FOR DESIGNING MANUFACTURABLE PATTERNS THAT ACCOUNT FOR THE PATTERN- AND POSITION-DEPENDENT NATURE OF PATTERNING PROCESSES

FIELD OF THE PRESENTLY PREFERRED EMBODIMENTS

The following embodiments generally relate to designing manufacturable semiconductor devices. More specifically, they relate to compensating the layout for the position- and pattern-dependent nature of infidelity in mask making, lithography, and etching in order to minimize variations across the lithography field.

BACKGROUND

Semiconductor device manufacturing comprises many steps of patterning layers. A layer is either the substrate of the semiconductor wafer or a film deposited on the wafer. At some steps, a pattern is etched into a layer. At some other steps, ions are implanted in a pattern into the layer. Patterning comprises: lithography, and etch or implant. The prevalent form of lithography is optical projection lithography, which involves making a mask or reticle that embodies the pattern to be projected onto the wafer; optically projecting an image of the mask onto a photoresist film coated on the wafer; exposing the photoresist; and developing the latent image, thereby making a stencil on the wafer. Other forms of lithography include: mask-less optical projection lithography where the mask is replaced by a spatial light modulator, which is driven by data representing the pattern; direct electron-beam writing lithography; and imprint lithography. All patterning processes, however faithful, distort the image to some extent. This adversely affects the performance of high-speed semiconductor devices. For example, line width variations at the gate level affect gate length, hence, speed and leakage current of CMOS transistors. Line width variations in the metal interconnection layers affect self and cross-capacitance and inductance of the interconnections. Unintentional variations in the line width limit the clock speed at which the device will function. Therefore, linewidth uniformity maps to higher revenue.

Linewidth can vary from wafer to wafer, across the wafer, across the lithography imaging field, and across the chip (die). Variations have systematic (reproducible) and random components. Minimizing the wafer-to-wafer and across the wafer variations is the object of automatic process control and automatic equipment control (APC/AEC), whereas reducing across-chip and across-field variations is best achieved by compensating the mask layout for across-field variations in the patterning process. The following processes contribute to pattern distortions. Some of these effects depend on the field position:

Mask writer position error: optical and electron-beam mask writers scan an image either in raster or vector mode. In either embodiment, electronic noise and nonlinearity in the driver circuit of the scanning system lead to random and systematic beam position errors, respectively. Mask writers move the wafer in the x and y positions, writing one swath at a time. Errors in wafer position cause stitching errors between swaths or fields.

Spreading of the mask writer beam: optical mask writers are subject to diffraction. Electron beams diverge due to the Coulomb force. Both effects spread the beam. This distortion does not depend on the position in the field, but ignoring it in mask design can cause across-chip variability.

E-beam proximity effect: In an e-beam mask writer, electrons scatter in the resist and in the mask. Scattered electrons laterally smear the exposure. The length scale of this effect is on the order of 10 µm on the mask. A software proximity correction modulates the exposure dose to compensate for the proximity effect. However, the correction is not perfect.

Fogging and flare in the mask writer: In an e-beam mask writer, secondary and backscattered electrons from the wafer scatter off parts of the e-beam column and chamber and expose the wafer. The length scale of fogging is on the order of 10 mm. Laser mask writers are subject to flare, which can be caused by multiple reflections between the interfaces of lenses and scattering from microscopic roughness of the surfaces of optical components.

Mask Etch: Etching of the chrome film on the mask depends on the average pattern density in a long-range (on the order of 1 mm). Variations in mean pattern density cause variations in the widths of features etched into chrome. Non-uniformity of silica etch-depth in phase shift masks cause phase errors.

Illumination of the lithography projector: The pupil illumination of the lithography projector has a prescribed shape such as a circle, annulus, or dipole. Either the intensity within the prescribed shape is assumed uniform, or the actual distribution is measured. If the illumination distribution differs from the one assumed during the chip design, the printed pattern will be distorted. If the pupil illumination pattern or total intensity varies across the slit of the lithography projector, this variation causes a pattern distortion that depends on the field position.

Multiple scattering at the mask: Scattering or diffraction of electromagnetic waves from a strong scatterer, such as the mask, is highly nonlinear due to multiple scattering. This effect is not position dependent but ignoring it in mask design can cause across-chip variability.

Imaging with finite aperture optics: Features of the aerial image are subject to the wave and electromagnetic field nature of light. The imaging system is a low-pass filter in the spatial frequency domain. This limits how fast light intensity can change as a function of position on the wafer. This is by far the most significant contributor to image distortion in the sub-wavelength domain. This distortion is not position dependent, but ignoring it in mask design causes strong across-chip variability.

Projection lens aberrations: Projections lenses have wavefront errors that are on the order of $1/100$ of a wave. The wavefront error depends on the position in the pupil plane and on the position in the image field, a total of 4 scalar variables. Lens aberrations distort the image in a pattern and position dependent manner.

Flare in the projection lens: Any mechanism that sends a portion of a light ray in an unintended direction increases the background light level and reduces the contrast. Such mechanisms include: volume-scattering in lenses due to density variations in the lens material; surface scattering off grinding marks and other surface roughness on lens and mirror surfaces; multiple reflections between lens elements, wafer, mask, or the lens barrel. Flare depends on the position in the imaging field.

Lithography scanner position error: Lithography stepper-scanners use a slit-shaped subset of the image field to keep the lens aberrations low. The size of the slit is on the order of 26 mm by 8 mm on the wafer. The wafer and the mask are scanned in synchronization along the short dimension of the slit on the order of 33 mm at speeds up to 500 mm/s. The mask and the wafer are scanned in opposite directions and the ratio of their displacements must equal the lens magnification precisely. Relative position errors between the wafer and the image of the mask on the wafer can have random and systematic components. Random position errors blur the image.

Diffusion of reactants in the resist: After the resist is exposed, its temperature is elevated. This process is called post-exposure bake. Elevated temperature increases the diffusion coefficient of the reactants in the resist. Diffusion diminishes the contrast of the high-spatial frequency components of the image. The diffusion length, which is on the order of 30 nm, can vary across the wafer. This distortion does not depend on the position in the field, but ignoring it in mask design causes across-chip variability.

Wafer-etch: The difference in a critical dimension in the developed resist pattern and in the etched pattern is called etch-bias. Etch bias depends on the density of the pattern over a long range. This can cause an across-chip variation in the etch bias.

Optical proximity correction is a technique that compensate for some of these distortions (see A. K-T Wong, Resolution enhancement techniques in optical lithography, SPIE Press, Vol. TT47, Bellingham, Wash., 2001; H. J. Levinson, Principles of Lithography, SPIE Press, Bellingham, Wash., 2001). However, this technique does not take into account the dependence of the patterning process on the position in the imaging field.

SUMMARY

The present invention is defined by the following claims, and nothing in this section should be taken as a limitation on those claims.

By way of introduction, the preferred embodiments described below provide a variety of computational models of a patterning process. One preferred computational model comprises (1) a position-dependent representation of lens aberrations and (2) a position-dependent representation of one or more of the following: flare, pupil illumination, chromatic aberrations, and stage error. Another preferred computational model comprises (1) a position-dependent representation of flare, (2) a position-dependent representation of pupil illumination, or (3) both a position-dependent representation of flare and a position-dependent representation of pupil illumination. Either one of these computational models can be implemented as computer-readable program code embodied in computer-readable media. The embodiments described herein explain techniques that can be used to adjust parameters of these models according to measurements, as well as how predictions made from these models can be used to correct lithography data. Corrected lithography data can be used to manufacture a device, such as an integrated circuit. Other preferred embodiments are provided, and each of the preferred embodiments described herein can be used alone or in combination with one another.

The preferred embodiments will now be described with reference to the attached drawings.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 1d is a symbolic representation of an idealized concept of design for manufacturability of an embodiment.

FIG. 1e shows top views of a target pattern PT, compensated layout $DFM(p_T)$, and the resulting pattern on the wafer, $F(DFM(p_T))$, of an embodiment.

FIG. 2a is a symbolic representation of a prior art patterning process with parameters to be determined.

FIG. 2b is a flowchart for determining the unknown process parameters in the model of the patterning process according to a prior art model based optical proximity correction.

FIG. 2c is a flowchart for applying a prior art model based optical proximity corrections.

FIG. 7d shows the mask-induced variability in the measurement in FIG. 7a.

FIG. 8d shows the mask-induced variability in the measurement in FIG. 8a.

DETAILED DESCRIPTION OF THE PRESENTLY PREFERRED EMBODIMENTS

General Overview and Definition of Terms

Figure 1A:
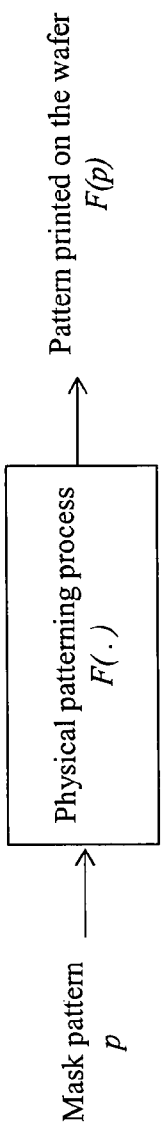
FIG. 1a is a symbolic representation of the patterning process of an embodiment as a transform of a mask pattern to a wafer pattern.

"Lithography data" refers to data sent to a mask maker or data sent to mask-less lithography equipment. Lithography data is input to the patterning process. In at least some embodiments, lithography data is compensated for imperfections in the patterning process. In some embodiments, the imperfections and the corrections both depend on the pattern, and on the position of features of the pattern in the imaging field. In other embodiments, the corrections are not position dependent. Patterning process includes mask making, optically projecting a pattern onto a photoresist film coated on the wafer, baking and developing the exposed resist, and etching the wafer. "Imaging field" or "image field" refers to a region on the mask and/or a corresponding (conjugate) region on the wafer where the image on the mask is projected onto the wafer at one static exposure or in one scanning motion. "Position in the imaging field" is synonymous with the position of a point on the wafer with respect to coordinate axes fixed on the projection lens at the beginning of the scanning or stationary exposure by which said point on the wafer is exposed.

When lithography data is compensated in the embodiments, the compensation is based on a computational model that describes the patterning process. "Computational model" and "mathematical model" are used synonymously. A computational model is a model of a patterning process that mathematically simulates some or all of the components of the patterning process. In one preferred embodiment, the computational model predicts the pattern that will be formed on the wafer given a pattern (preferably, an arbitrary two-dimensional pattern) described by the lithography data. "One-dimensional pattern" refers to a pattern whose critical dimensions are contained in a region where the pattern is substantially invariant along a direction in the plane of the mask over a distance that is substantially greater than the range of influence. "Range of influence" is the largest separation between features in a pattern where the presence of one feature substantially influences how the other feature is transferred to the wafer. One-dimensional patterns comprise a line, a space, or lines and spaces that are parallel to each other. Union of one-dimensional patterns that are separated by at least the range of influence is a one-dimensional pattern. Two-dimensional patterns are patterns that are not one-dimensional. For example, the pattern in FIG. 1b is a two-dimensional pattern. In one preferred embodiment, the computational model comprises a calculation of the electromagnetic field intensity at the photoresist film resulting from projecting a mask pattern with one and/or two-dimensional features onto the wafer. In the preferred embodiment of the computational model, at least one of lens aberrations, flare, and pupil illumination is described as a function of position of the features of the pattern with respect to the projection lens. The computational model comprises mathematical representations of physical processes. "Representation" refers to a formula or any mathematical construct that quantitatively describes a physical process. Representations, and, therefore, the computational model, have adjustable parameters. Parameters are scalar real or complex numbers or a finite array of such scalar numbers. Changing a parameter of the model changes the wafer pattern that the model will predict for a fixed set of lithography data. Some parameters depend on the position in the image field. A "position-dependent parameter" is a parameter that does not assume the same value at all points in the image field. A representation, hence a model, that has position-dependent parameters is "position-dependent." A position-dependent model has the following property: if a pattern centered at point A in the image field, including its surrounding environment, is translated to a point B in the image field, a position-dependent model will predict different patterns resulting on the wafer for the two cases. The difference will be more than a translation. That is, a position-dependent model is not shift-invariant.

The values of the adjustable parameters of the model are preferably determined by direct measurements whenever possible. The pupil illumination, lens aberrations, chromatic aberrations, and lens flare of the lithography equipment can be determined as a function of position in the field by in situ metrology provided by lithography equipment when in situ measurements are available. When in situ metrology is not available, test masks that are specific to measuring pupil illumination, aberrations, and flare can be used to print test patterns on wafers. The parameters of the lithography equipment can then be extracted from metrology performed on the resulting patterns on the wafer. Parameters of the photoresist can be determined from metrology performed on test patterns printed in resist. Preferably, all test patterns are repeated at many locations in an imaging field so that measurements characterize the position dependence of the patterning process. Mask data can be compensated by solving an optimization problem: the mask data that minimizes the difference between the target pattern and the pattern predicted by the position-dependent computational model is minimized.

Figure 1B:
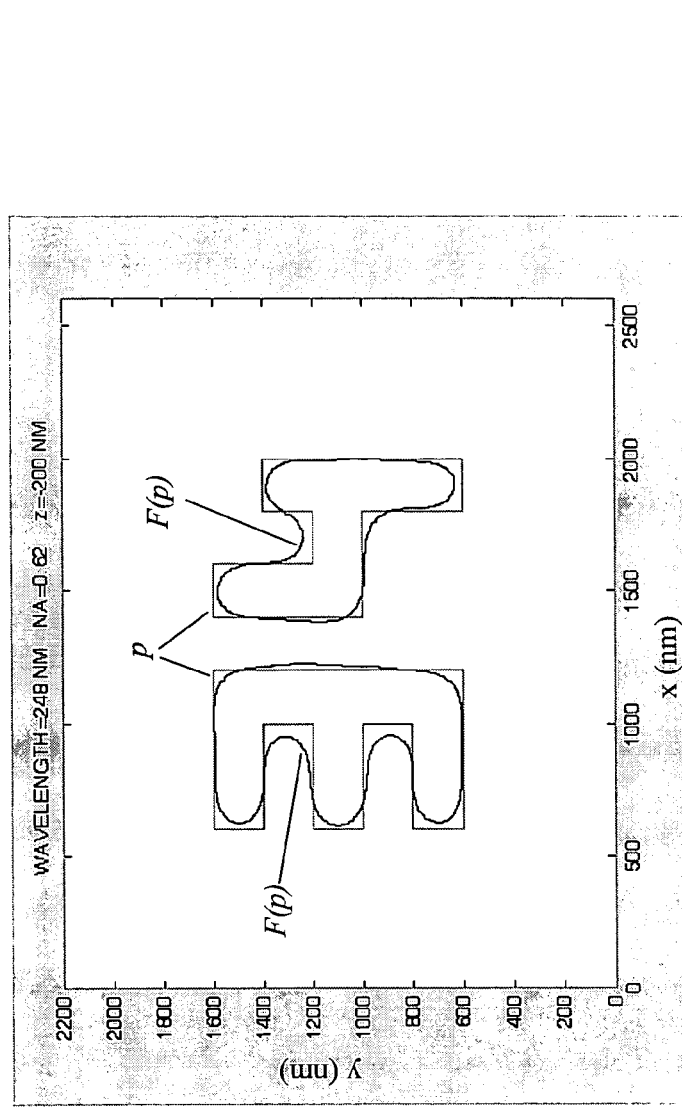
FIG. 1b is the top view of a mask pattern p and the resulting wafer pattern F(p).

Turning now to the drawings, FIG. 1a symbolically illustrates an input pattern p (lithography data) that is submitted to the patterning process and transformed into pattern F(p) on the wafer as a result of the patterning process. FIG. 1b illustrates the same concept by a calculated example. The input pattern p is the data that is sent to the mask shop, and, in the case of mask-less lithography, the data sent to the spatial light modulator. Pattern p is a function that maps the mask surface, a subset of the Euclidian space $R^2$, onto the set $\{0,1\}$ in the case of binary masks. The values 0 and 1 indicate opaque and clear areas on a binary mask, respectively.

$$p_{BINARY}: R^2 \rightarrow \{0,1\}$$

In the case of alternating aperture phase shift masks (PSM), p assigns, to each location, a value on the phase shift mask, and another value on the binary trim mask. The value on the phase shift mask is −1 for clear regions with glass etched to produce 1800 phase shift, 0 for opaque regions, and +1 for clear areas where the glass is not etched.

$$pPSM: R^2 \rightarrow \{-1,0,0\} \times \{0,1\}$$

The concept of mask pattern, p, a map from a domain in the two dimensional Euclidian space $R^2$ to a finite set, equally applies to attenuated phase-shift masks, chrome-less phase shift masks and multi-level PSM masks.

Figure 1C:
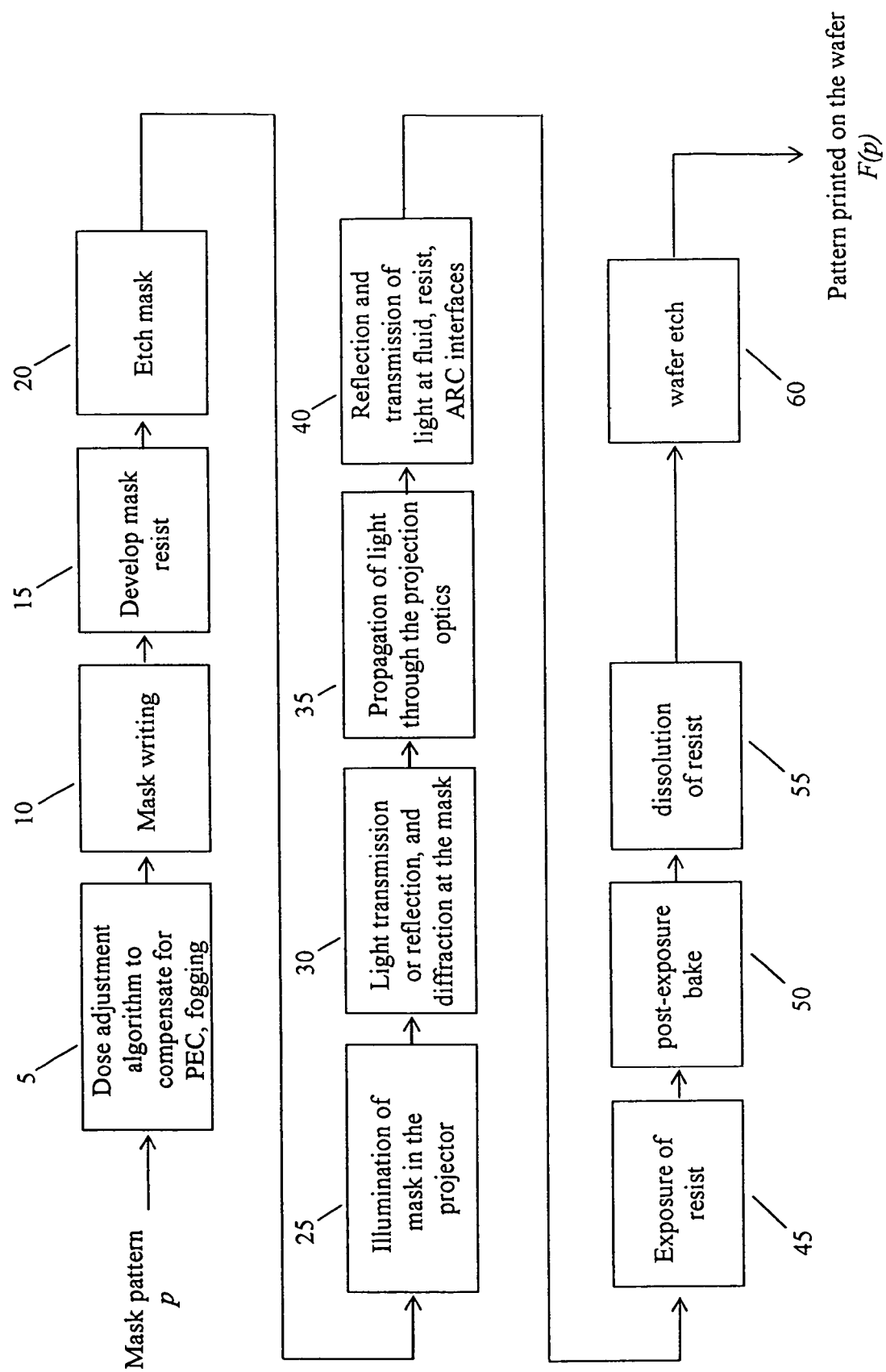
FIG. 1c is the flow diagram of an embodiment of the chain of physical processes that transform mask data p into a pattern F(p) etched into the wafer.

The physical patterning process can be viewed as an operator F(.) that transforms mask patterns into wafer patterns. In the case of binary masks, F(.) maps the set of binary patterns into itself. In the case of alternating PSM, F(.) maps the PSM mask and its trim mask to the wafer pattern. The operator F(.) describes the action of a chain of physical processes that are illustrated as a process flow diagram in FIG. 1c. These processes can be, characterized as mask making (boxes 5, 10, 15, and 20), optical projection (25, 30, 35, and 40), resist dynamics (boxes 45, 50, and 55), and wafer etch (box 60). As described herein, representations of one or more of these processes can be included in the computational model. When all of these processes are included, the computational model is an end-to-end model of the patterning process. The transform F(.) is neither injective nor subjective. In other words, distinct sets of mask data can result in the same pattern etched in the wafer; and not every pattern can be formed in the wafer.

FIG. 1*d* symbolically illustrates an idealized concept of design for manufacturability (DFM). The same concepts are illustrated by a computed example in FIG. 1*e*. In this narrow context, DFM is a transform that maps the target for the wafer pattern into a mask pattern. Given a target pattern $p_T$, DFM produces a pre-distorted mask pattern, $DFM(p_T)$. This is the lithography data that is to be submitted to the mask making process, not the pattern that is actually formed on the mask. When the output of DFM is submitted to the physical patterning process, the pattern resulting on the wafer, $F(DFM(p_T))$, is a close approximation of the target pattern, $p_T$. In other words, the map DFM(.) is an approximate inverse of the physical process F(.). The goals of the map DFM can include rendering $F(DFM(p_T))$ insensitive to variations in focus and exposure dose, lens flare, aberrations, and bandwidth of the light source. Determining the compensated pattern $DFM(p_T)$ involves solving an optimization problem.

The map DFM(.), as defined above, is an idealized concept that can only be approached in some approximation. Optical proximity correction (OPC) is one such approximation in the prior art. OPC is practiced in either a rule-based or model-based fashion. Rule-based OPC applies previously-determined corrections such as: changing line widths according to a table of line widths on the wafer as a function of pitch and line width on the mask; adding serifs and anti-serifs to the outer and inner sides of corners; adding hammer-heads to the line ends; and adding assist features next to lines. Model-based OPC is an optimization algorithm. The optimization algorithm has a mathematical model of the physical process, i.e., a sub-algorithm that predicts the pattern F(p) that will result on the wafer given input patterns. Prior art model-based OPC algorithms typically comprise a calculation of the light intensity at the wafer but do not model all physical sub-processes. Most OPC algorithms consider diffusion of a quantity that is proportional to the light intensity. There are more detailed algorithms that contain nonlinear models of reaction-diffusion dynamics of resist chemistry (see C. Mack, *Inside PROLITH: A Comprehensive Guide to Optical Lithography Simulation,* 1997, Finle Technologies, Austin, Tex.; SOLID-C software by Sigma-C GmbH, Munich, Germany). Such algorithms are too computationally intensive to perform OPC on an entire very large-scale integrated circuit. There is no known prior art that compensates lithography data according to an end-to-end computational model of the subprocesses shown in FIG. 1*c*.

FIG. 2*a-c* describe model-based OPC as it is practiced in the prior art. FIG. 2*a* illustrates a mathematical model $F_\xi(.)$ with an array $\xi$ of adjustable parameters. Given the input pattern p, the model predicts the pattern $F_{86}(p)$ that will print on the wafer. The outcome depends on the value of adjustable parameters $\xi$ of the model, which are initially unknown. The array of unknown parameters $\xi$ includes a constant chemical threshold or a multitude of parameters that describe a variable threshold; resist blur; flare intensity and its Gaussian length-scale; parameters of the pupil-illumination; and lens aberrations. The array $\xi^*$ is estimated by designing and making a test mask at 100 (see FIG. 2*b*); printing a multitude of test structures on a test wafer and performing metrology on the test structures at 110; providing an initial guess for the process parameters at 120; and iteratively adjusting the parameters $\xi$ at 140 until the prediction of the computational model $F_\xi(p)$ agrees at step 130 with the measurements performed on the test wafer. This process, called calibration or tuning of the OPC model, can be mathematically described as:

$$\xi^* = \underset{\xi}{\operatorname{argmin}}\, d(\text{printed test pattern, pattern predicted by model } F_\xi(p_{TEST})) \quad (1)$$

The expression $$\underset{\xi}{\operatorname{argmin}}\, Q(\xi)$$

denotes the value of $\xi$ that minimizes $Q(\xi)$. The metric $d(p_1, p_2)$ is a measure of dissimilarity of two patterns $p_1$ and $p_2$. A metric that is used in the prior art is:

$$d^2(p_1, p_2) = \sum_{j=1}^{J} [CD_{1,j} - CD_{2,j}]^2 \quad (2)$$

Where $CD_{1,j}$ is a critical dimension at the $j^{th}$ measurement location on pattern $p_i$. The critical dimension can be the width of a line, the distance between two lines, or any other measurable dimension in the pattern. The index $j=1,2,\ldots J$ labels the predetermined metrology sites.

Once the forward model $F_\xi(.)$ of the process is determined at step 150, given a target pattern $p_T$, the mask data $p_{MASK}$ is obtained by approximately solving the equation:

$$p_{TARGET} \approx F_\xi(p_{MASK}) \quad (3)$$

Equation (3) is solved by an optimization algorithm:

$$p_{MASK} = \underset{p}{\operatorname{argmin}}\, d(p_{TARGET}, F_\xi(p)) \quad (4)$$

This is shown by a flowchart in FIG. 2*c*. The circuit and its layout are designed at step 160. The output of step 160 is $p_{TARGET}$, the pattern desired on the wafer. An initial guess for the mask pattern $p_{MASK}$ is provided at step 170. For binary masks, the initial guess can be $p_{TARGET}$ or some rule based OPC applied to $p_{TARGET}$. The initial guess and the model of the patterning process obtained at step 150 are used to solve the optimization problem (4) at steps 180 and 185. The optimization is typically performed by the alternating direction minimization or simulated annealing methods (see Kirkpatrick, S., C. D. Gelatt Jr., M. P. Vecchi, "Optimization by Simulated Annealing," *Science,* 220, 4598, 671-680, 1983; Metropolis, N., A. Rosenbluth, M. Rosenbluth, A. Teller, E. Teller, "Equation of State Calculations by Fast Computing Machines," *J. Chem. Phys.,* 21, 6, 1087-1092, 1953). The iteration is stopped at step 185 when a predetermined number of iterations is reached, or the cost function $d(p_{TARGET}, F_\xi(p_{MASK}))$ falls below a predetermined value, or the rate of change of the cost function falls below a predetermined value. At step 190, the output of the OPC process, $p_{MASK}$ is obtained. It is used for mask making after further design rule and optical verification.

A deficiency in the prior art is that the computational model $F_{\xi}(.)$ of the patterning process does not include variations in lens aberrations in addition to pupil illumination and/or flare as a function of position in the image field. Each process equipment has its particular fingerprint of imperfections and systematic variations of the imperfections across the image field.

Another deficiency of some prior art is the assumption that interactions between features in the pattern is shift-invariant. That is, according to some prior art, how a feature on the mask affects its neighbors depends on the relative position of the features but not on their positions with respect to the projection lens:

$$u(x,y) = \int\int K(x-x', y-y')u_0(x', y')dx'dy' \quad \text{(Prior art)} \quad (5)$$

In equation (5), $u(x, y)$ is a physical quantity, such as the aerial image intensity, and $K(x-x', y-y')$ is the kernel or point spread function of a physical effect, such as flare. The intensity is $u_0(x, y)$ in the absence of flare and $u(x, y)$ with flare. In another example; $u_0(x, y)$ is the optical field after the mask, and $u(x, y)$ is the field at the wafer. Equation (5) describes a shift-invariant physical phenomenon: the point-spread function depends only on the difference of the observation point $(x, y)$ and the source point $(x', y')$. However, the assumption of shift-invariance does not represent some subtle effects in lithography. Flare in the lithography projection lens is strongly dependent on the distance from the center of the field even when the pattern density is uniform over the wafer (see E. Luce et al., "Flare impact on the intrafield CD control for sub-0.25 µm patterning," SPIE Vol. 3679, p. 368-381, March 1999). Lens aberrations vary over the image field (see Mark van der Kerkof, et al, "Full optical column characterization of DUV lithographic projection tools," SPIE 29$^{th}$ Annual International Symposium on MicroLithography, paper 5377-212, 22-27 February 2004, Santa Clara, Calif.). A more general form of equation (5) that does not assume shift invariance is:

$$u(x, y) = \int\int K(x, y; x', y')u_0(x', y')dx'dy' \quad (6a)$$

Or equivalently:

$$u(x, y) = \int\int \tilde{K}(x, y; x-x', y-y')u_0(x', y')dx'dy' \quad (6b)$$

Prior art OPC does not consider physical phenomenon of the form (6a) or (6b). Even though Schellenberg ["Resolution enhancement with OPC/PSM," Future Fab International, Vol. 9, 2000] suggests taking field-dependent aberrations into account in OPC, and Martin teaches making rule-based position-dependent corrections in [U.S. Patent Application No. U.S. 2003/0003385 A1, 2003], neither Schellenberg nor Martin discloses a computational model that takes into account position-dependent representations of both lens aberrations and other factors such as flare, pupil illumination, chromatic aberrations, and stage error.

Position-Dependent Computational Model

In preferred embodiments, a computational model of the transformation of lithography data to patterns on the wafer is used. The computational model calculates the combined effect of some or all of the chain of processes shown in FIG. 1c. The computational model preferably calculates, at least, the effects of optical projection. The computational model can further calculate the combined effects of optical projection and one or more of mask making, wafer etch, and resist dynamics. The following equations start at the development of resist and go backward in the chain of sub-processes shown in FIG. 1c. Resist development is approximately modeled as a thresholding operation. The resist pattern $F(p)$ after development is:

$$F(p) = K_{\{r_\perp | U_{LATENT}(r_\perp) \leq threshold\}} \quad (7a)$$

The transverse position vector $r_\perp$ is short for $(x,y)$. The function $K_\Omega(r)$ is the characteristic function of the set $\Omega$:

$$K_\Omega(r) = \begin{cases} 1, \text{ if } r \in \Omega \\ 0, \text{ if } r \notin \Omega \end{cases} \quad (7b)$$

The latent image, $U_{LATENT}(r_\perp)$, is a scalar function. For example, it is one minus the normalized concentration of a dissolution inhibiting compound in the resist, after the post-exposure bake. The scalar parameter threshold, a property of the resist, will be determined in the characterization procedure described in the next section. The latent image is determined from the intensity of the light in the resist in the following manner:

$$U_{LATENT}(r_\perp) = \int\int psf_{RESIST}(r_\perp - r'_\perp, r_\perp)U(r'_\perp)d^2r'_\perp \quad (7c)$$

The point-spread function of the resist-blur, $psf_{RESIST}$, can be represented by a sum of Gaussians, a Lorentzian, or other functions that have a maximum at the origin and that falls off to zero with increasing distance from the origin [T. Brunner et al., "Impact of resist blur on MEF, OPC, and CD control," Proc. SPIE 5377, SPIE Bellingham, Wash., 2004]. The multi-Gaussian point-spread function is:

$$psf_{RESIST}(r_\perp - r'_\perp, r_\perp) = \quad (7d)$$

$$\sum_{n=1}^{N_R} \frac{a_n}{2\pi\sigma_n} \exp\left(-\frac{(r_\perp - r'_\perp)\cdot(r_\perp - r'_\perp)}{2\sigma_n^2} - \frac{((r_\perp - r'_\perp)\cdot\hat{u}_s)^2}{2\sigma_{SCAN}^2(r_\perp)}\right)$$

The parameters of resist blur, $a_1, \sigma_1, a_2, \sigma_2, \ldots a_{N_R}, \sigma_{N_R}$, are determined by the characterization process described in the next section. The parameter $\sigma_{SCAN}$ in (7d) accounts for image blurring that results from the jitter of the wafer and mask stages in a stepper-scanner. The unit vector $\hat{u}_s$ points in the scan direction. In a stepper-scanner, the wafer and mask stages move in opposite directions, at different speeds so that the image of the mask is stationary in a reference frame fixed on the wafer. The motion is monitored by interferometers and controlled by a feedback loop. Dynamic systems under feedback control typically make excursions about their goal. Such excursions cause image blur in the scan-direction. Stage jitter refers to a particular form of stage error where the stage oscillates about its ideal position either randomly or in a deterministic manner. The stage jitter can have a reproducible variation in the stepper-scanner field. A random jitter can have a variance that is a reproducible function of scan position. Therefore, $\sigma_{SCAN}(r_\perp)$ in general depends on the field position. Its value is determined by the characterization process described in the next section.

The optical intensity in the photoresist, $U(r_\perp, z)$ in (7c), is the sum of: $U_0(r_\perp, z)$, the un-diffused part of the image; $U_{FLARE}(r_\perp, z)$, intensity of the scattered, diffuse light:

$$U(r_\perp, z) = U_0(r_\perp, z) + U_{FLARE}(r_\perp, z) \quad (7e)$$

$$U_0(r_\perp, z) = \int\int E(r_\perp, z; k_\perp^{(i)})|^2 I(k_\perp^{(i)}, r_\perp)d^2k_\perp^{(i)} \quad (7f)$$

The vector field $E(r_\perp, z; k_\perp^{(i)})$ is the electric field in the resist as a result of illuminating the mask with a plane wave. The two-dimensional vector $k_\perp^{(i)}$ is the transverse component of the wave-vector of the plane wave that is incident on the mask. All transverse position vectors and wave-vectors in this discussion are preferably at the wafer (image plane) scale. A projector that reduces spatial dimensions by a factor of four enlarges transverse wave-vectors by a factor of four. A vector is transverse if it lies in a plane that is perpendicular to the axis of the projection optics. The integral in (7f) is an incoherent summation over the pupil of the illuminator. The illumination function $I(k_\perp^{(i)}, r_\perp)$ is the power-spectrum density of the illumination with respect to the transverse wave-number, $k_\perp^{(i)}$. The illumination function is ideally not a function of the field-position, $r_\perp=(x_f, y_f)$. In an actual illuminator, the total illumination intensity $\iint I(k_{195}^{(i)}, r_\perp)d^2k_\perp$, as well as the distribution of the light within the pupil of the illuminator, depend on the field-position [C. Bodendorf, et al., Impact of measured pupil illumination fill distribution on lithography simulation and OPC models," Proc. SPIE Vol. 5377, Article 110, 2004; G. McIntyre et al., "Characterizing illumination angular uniformity with phase shifting masks," Proc. SPIE Vol. 5040, Article 16, 2003, SPIE Bellingham, Wash.]. Preferably, the lithography data is synthesized by taking into account the dependence of pupil illumination, $I(k_\perp^{(i)}, r_\perp)$, on the position $r_\perp$ in the field. The pupil illumination is either directly measured or deduced from out-of-focus resist images of pinholes in a mask at multiple field locations.

The electric field is treated as a scalar quantity in the following equations for simplicity. The preferred embodiments are not limited to a scalar approximation of optical projection. The concept presented here is extended to the vector calculation described in [D. G. Flagello, "Theory of high-NA imaging in homogeneous thin films," Optical Society of America, A, Vol. 13, No. 1, 1996]. The field is:

$$E(r_\perp, z; k_\perp^{(i)}) = \iint P(k_\perp)T(k_\perp)\exp(ik_\perp \cdot r_\perp - ik_z z + i2\pi W(k_\perp, r_\perp))\hat{m}(k_\perp - k_\perp^{(i)})$$

The pupil function $P(k_\perp)$ is:

$$P(k_\perp) = \begin{cases} 1-\varepsilon, & \text{if } k_\perp \cdot k_\perp \leq (2\pi NA/\lambda)^2 \\ 0, & \text{if } k_\perp \cdot k_\perp > (2\pi NA/\lambda)^2 \end{cases} \quad (7h)$$

or the product of (7h) and a function of position in the pupil of the projector. $\lambda$ is the wavelength in vacuum, and NA is the numerical aperture of the projection optics. The parameter $\varepsilon$ accounts for the fact that some of the light power is scattered and is therefore lost to the unscattered image. The parameter $\varepsilon$ in general depends on the pupil position and the field position. The function $T(k_\perp)$ is the complex Fresnel transmission coefficient for plane waves into the resist layer. $T(k_\perp)$ accounts for multiple reflections at the interfaces of air or immersion fluid, top antireflection coating, resist, bottom antireflection coating, films deposited on the wafer. Although not explicitly shown in (7g), $T(k_\perp)$ depends on polarization. Calculation of $T(k_\perp)$ in a layered medium is well known [J. A. Kong, Electromagnetic Wave Theory, John Wiley & Sons, 2$^{nd}$ Ed., 1990].

Figure 5:
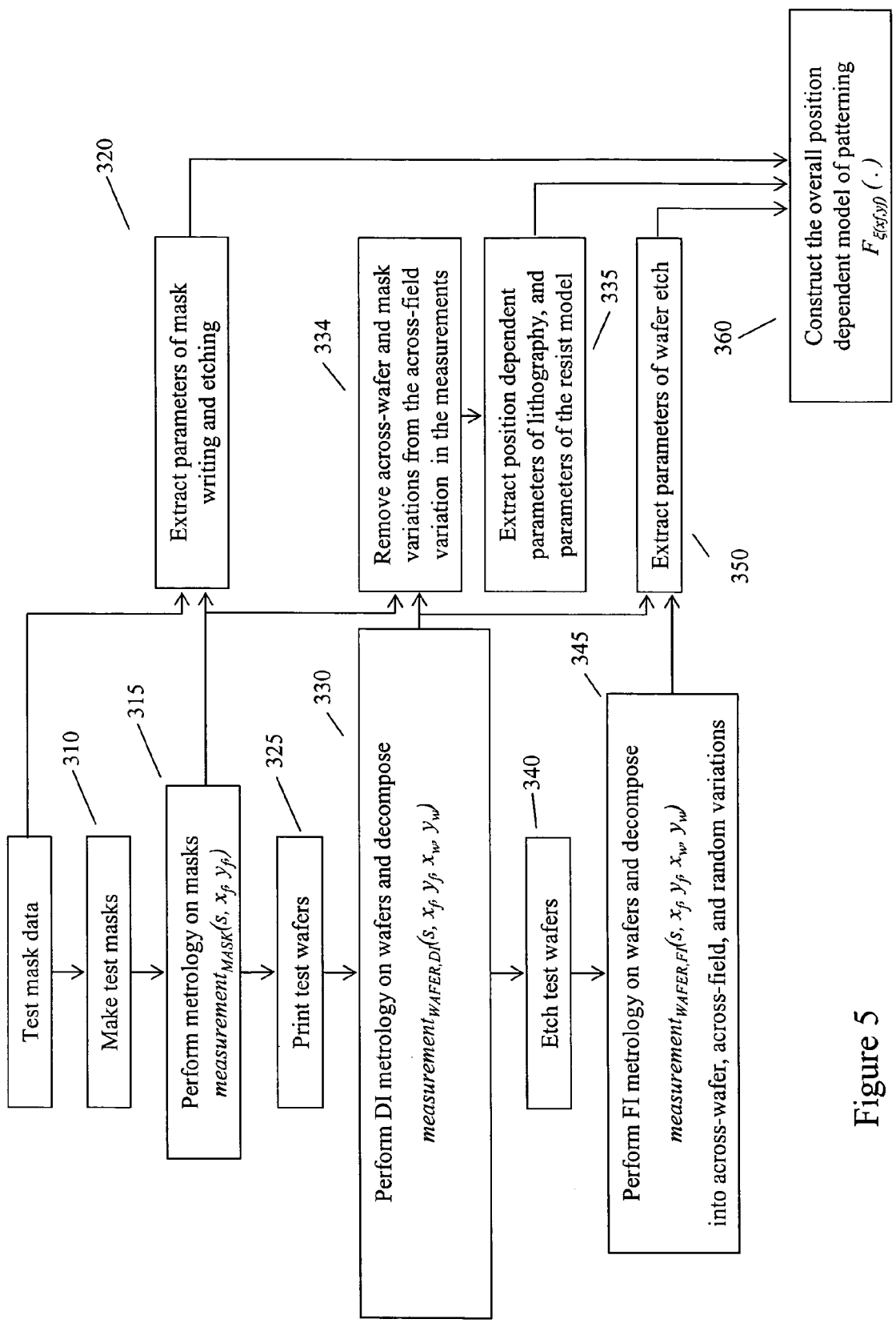
FIG. 5 is a flowchart for extracting a position-dependent model of the patterning process from test measurements according to embodiment B.

The function $W(k_\perp, r_\perp)$ in (7g) is the wave-front error in units of waves. In other words, $W(k_\perp, r_\perp)$ is an optical path error normalized by the wavelength. Ideally, when a point A on the object plane (mask) is imaged to a point A' on the image plane (wafer), all rays that issue from A and that pass through the projection optics arrive at A' having traveled the same optical path $\int n\,dl$. In practice, each ray that issues from A and goes through A' travels a slightly different optical path length. The optical path error, $\lambda W(k_\perp, r_\perp)$, depends on the path taken from A to A'. The path taken from A to A' is uniquely determined by four scalar dimensions: $r_\perp$, the position of A or A' in the field; and the direction in which the ray issues from A, which is determined by the transverse wave-vector $k_\perp$. The value of $W(k_\perp, r_\perp)$, which is ideally zero, is typically on the order of 0.01 for $\lambda=193$ nm lithography instruments at the time of this writing. FIG. 5 in [Mark van der Kerkof, et al, "Full optical column characterization of DUV lithographic projection tools," Proc. SPIE Vol. 5377, Article 212, 2004] clearly shows that $W(k_\perp, r_\perp)$ depends on four scalar variables. $W(k_\perp, r_\perp)$ may depend on polarization. Preferably, the lithography data is synthesized by taking into account the dependence of the wavefront error on the position $r_\perp$ in the field. The wavefront error is either directly measured or deduced from measurements on test patterns as a function of field position.

The function $\hat{m}(k_\perp)$ is the two-dimensional Fourier transform of the mask pattern $p_{MASK}(r_\perp)$ (lithography data). For example, for a binary mask, $$\hat{m}(k_\perp) = (2\pi)^{-2} \iint p_{MASK}(r_\perp)\exp(-ik_\perp \cdot r_\perp)d^2r_\perp \quad (7i)$$

The axial component $k_z$ of the wavenumber in (7g) is:

$$k_z^2 = (2\pi n/\lambda)^2 - k_x^2 - k_y^2 \quad (7j)$$

n is the refractive index of the fluid between the lens and the wafer. Flare is calculated as:

$$U_{FLARE}(r_\perp, z) = \sum_{j=1}^{N_F} \iint psf_{FLARE}^{(j)}(r_\perp - r'_\perp) U^{(j)}(r'_\perp) d^2 r'_\perp \quad (7k)$$

which is a sum of convolutions of point-spread functions $psf^{FLARE(j)}$ with distorted images $U^{(j)}(r_\perp)$.

$$U^{(j)}(r_\perp) = \iint |E^{(j)}(r_\perp, k_\perp^{(i)})|^2 I(k_\perp^{(i)}, r_\perp) d^2 k_\perp^{(i)}$$

$$E^{(j)}(r_\perp) = \iint P^{(j)}(k_\perp, r_\perp)\exp(ik_\perp \cdot r_\perp + i2\pi W(k_\perp, r_\perp))\hat{m}(k_\perp - k_\perp^{(i)})d^2 k_\perp \quad (7L)$$

The summation in (7k) accounts for different flare mechanisms. In the simplest embodiment, there is only one term in the sum, and $U^{(1)}(r_\perp) = U_0(r_\perp, 0)$ is the same as the image in the absence of flare. There are different contributors to flare with different length scales. Volume scattering from the density fluctuations in lens blanks, scattering from surface roughness at the lens interfaces, and splitting of rays due to birefringence are different mechanisms of flare. Each mechanism has a point-spread function with a different fill-width-half max (length scale) on the wafer. Chief rays that go through the center of the pupil suffer multiple reflections between the wafer and the mask without walking away from the image point from one reflection to the next. Rays that hit the barrel and mounts of the lenses, although mostly absorbed, scatter far from their intended directions. Each of these mechanisms, labeled by superscript (j), not only has a different point-spread function, but also a different pupil function $P^{(j)}(k_\perp, r_\perp)$ that accounts for the intensity of light that is available to that particular scattering mechanism. The pupil function $P^{(j)}(k_\perp, r_\perp)$ depends on the position in the pupil, and on the field position. Consider following two examples to clarify this point:

Example 1: the chief ray that issues from the point at the center of the field hits every lens interface perpendicularly. Whereas, the chief ray that issues from a point at the edge of the field hits most lens interfaces obliquely. Therefore, the pupil function $P^{(j)}(k_\perp,r_\perp)$ for multiple reflections has a peak at $k_\perp$, $=0$ and $r_\perp=0$.

Example 2: marginal rays that issue from a point at the edge of the field can reach the mounts of some lens elements when the marginal rays from a point at the center of the field do not. The pupil function for scattering from lens mounts peaks close to the ring $|k_\perp|=2\pi NA/\lambda$ in the pupil plane, and it increases toward the edge of the field. High-spatial-frequency components of the mask function scatter light in directions that are too oblique to pass through the aperture of the projection lens. The intensity in such rays is partially absorbed. The remaining intensity contributes to flare. Therefore, for this flare contribution, the pupil function $P^{(j)}(k_\perp,r_\perp)$ can be non-zero outside the pupil of the lens, $|k_\perp|>2\pi NA/\lambda$.

These two examples show that power that is available for each particular flare mechanism depends on how light is distributed in four scalar dimensions, namely, $(k_\perp, r_\perp)$. Preferably, lithography data is synthesized by taking into account the dependence of the scattering efficiency on the position $r_\perp$ in the field and/or the position in the pupil plane. Flare is either directly measured or deduced from measurements on test patterns as a function of field position.

Quantitative Characterization

This section describes quantitative characterization of the patterning process and its dependence on position. Characterization is preferably done by a combination of measurements on patterning equipment and/or measurements on test patterns formed on wafers. Measurements are preferably done at multiple points in the field. Parameters of a computational model, such as described in the previous section, are preferably selected so that predictions of the computational model agree with the measurements, and especially the position-dependence of the measurements.

Figure 3:
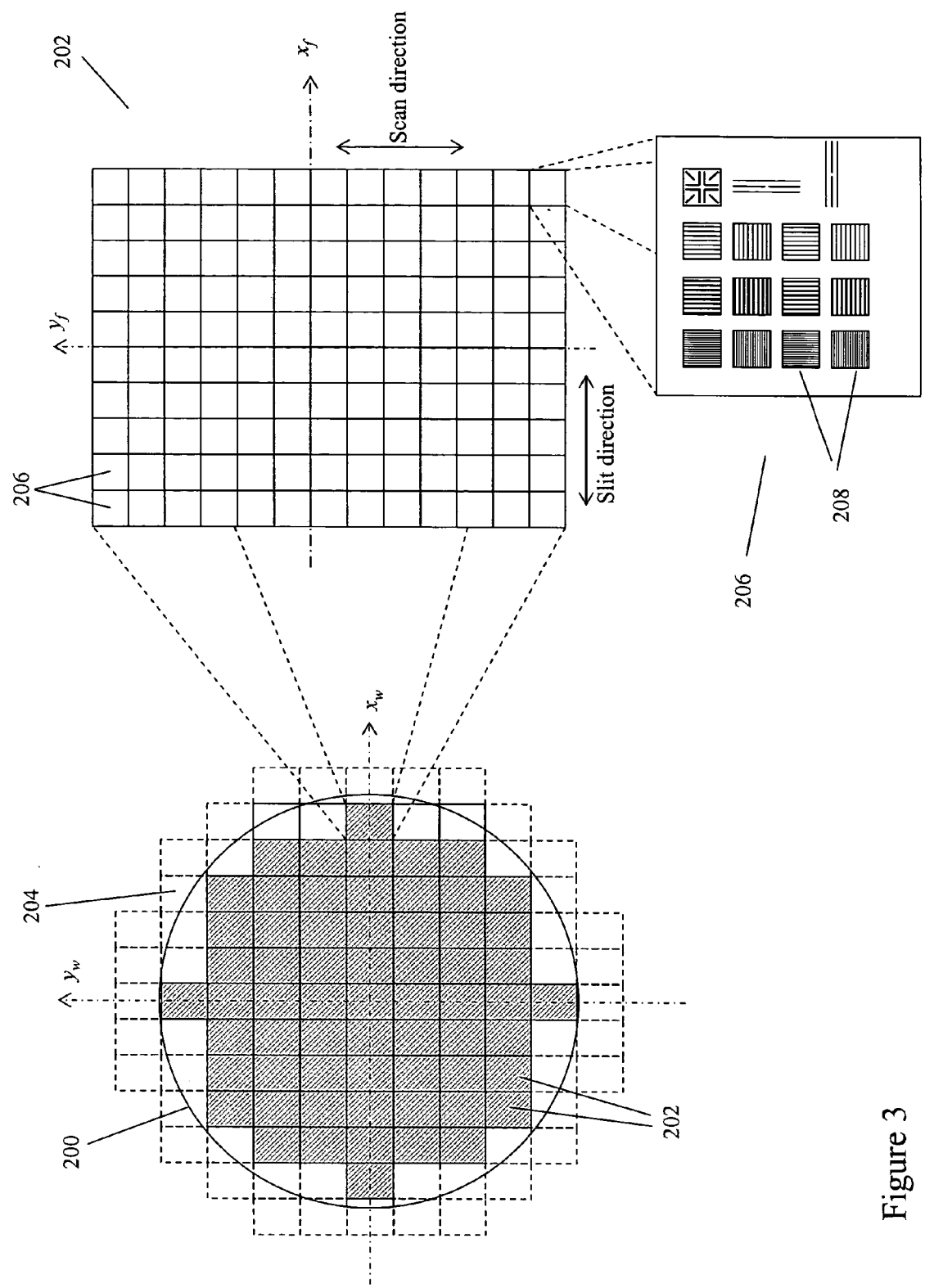
FIG. 3 illustrates top views of a wafer, a stepper-scanner field, and a zone with test structures of an embodiment.

With reference to FIG. 3, test masks have a unit cell 206 that is repeated many times in the stepper-scanner field. The unit cell is repeated many times in the long direction of the slit of the stepper-scanner lens, and optionally, many times in the scan direction. The unit cell will be called a zone from here on. FIG. 3 shows an example where sixty-one 26 mm×33 mm full-fields 202, and partial-fields 204 are printed on wafer 200, which has a diameter of 300 mm. Each field 202 is divided into 10×13 identical zones 206. The dimensions of the zones are approximately 2.60 mm×2.54 mm. In this example, there are 13 zones in the scan direction and 10 zones along the long dimension of the stepper-scanner slit, which amounts to 130 zones in one stepper-scanner field. Other dimensions, number of zones, and number of fields are possible. Each zone 206 contains the same set of test structures. The test structures 208 are designed to probe the process parameters. Each zone contains a multitude (on the order of 100) of test structures. Most of the test structures within one zone are preferably distinct. One or more measurements are performed on all or a subset of test structures in a zone. FIG. 3 is a schematic drawing. Neither the number nor the shape of the test structures 208 is accurately represented in FIG. 3.

Embodiment A

In one preferred embodiment (Embodiment A), physical effects are isolated and measured separately from each other as much as possible. This approach, schematically shown in FIG. 4, preferably uses multiple tests to characterize the patterning process.

Wavefront Error

Figure 4:
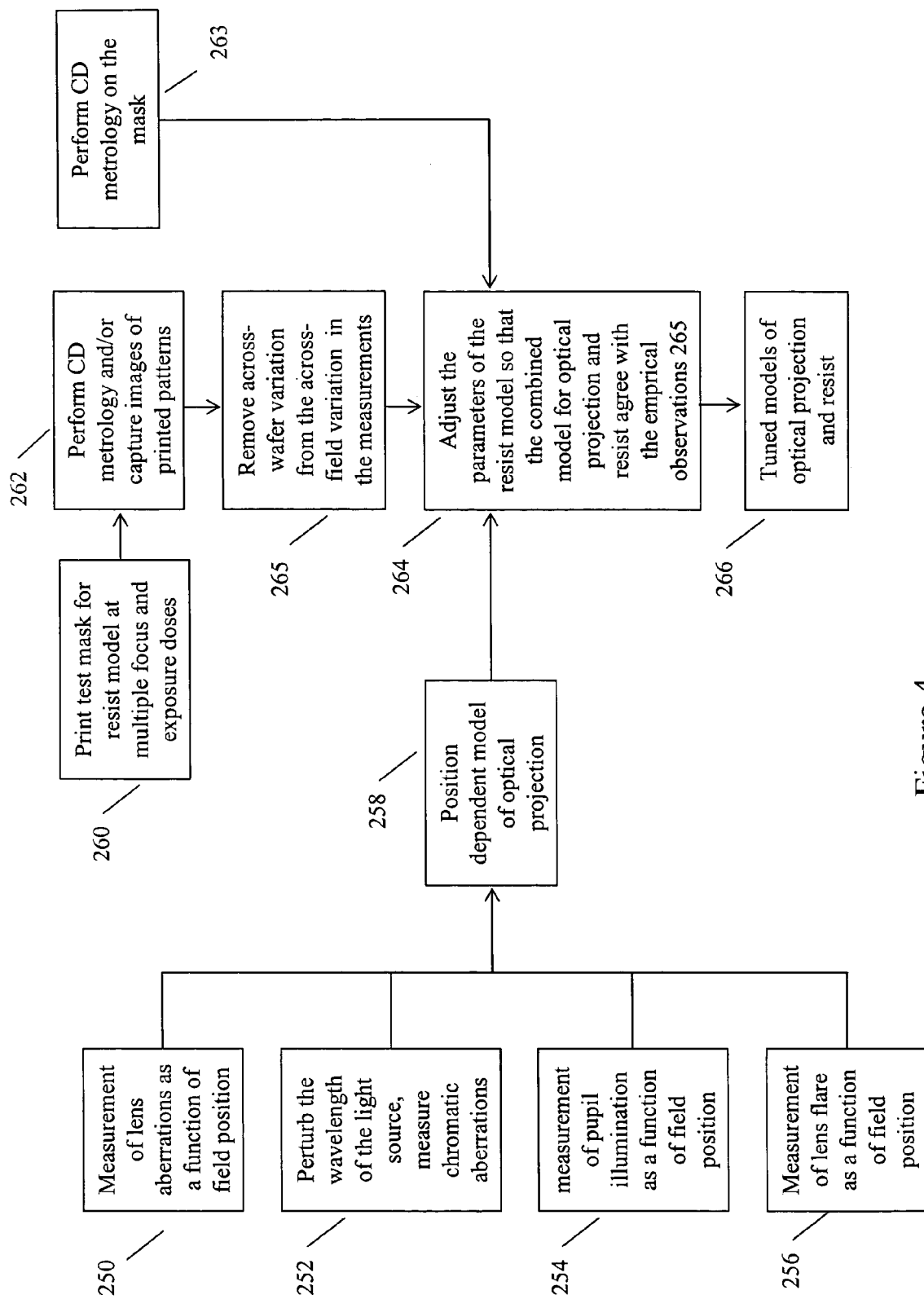
FIG. 4 is a flowchart for extracting a position-dependent model of the patterning process from test measurements according to embodiment A.

Referring to FIG. 4, wavefront error (lens aberrations), $W(x_{pupil},y_{pupil},x_{field},y_{field})$, or equivalently, $W(k_\perp, r_\perp)$, is measured as a function of position in the lens pupil and position in the field at 250. The measurement is performed using an interferometer placed into the lithography equipment in the preferred embodiment. The interferometer can be a lateral-shearing interferometer, a radial-shearing interferometer, or a Shack-Hartman interferometer (see J. M. Geary, *Introduction to Wavefront Sensors*, Vol. TT18, SPIE Optical Engineering Press, Bellingham, Wash., 1995). The interferometer can be built into the lithography equipment (see M. van der Kerkof et al., Proc. SPIE Vol. 5377, Article 212, SPIE, Bellingham, Wash. 2004) or provided as temporary test equipment.

Alternatively, the wavefront error can be extracted at 250 by: placing a special test jig in the mask stage; printing and developing wafers; performing overlay metrology on the resist patterns; and processing the overlay measurements to obtain the wavefront error, $W(x_{pupil},y_{pupil},x_{field},y_{field})$ (see U.S. Pat. No. 5,978,085 to Smith et al.).

In another alternative embodiment of 250, a test mask with features that are specifically designed to measure lens aberrations is used. Aberration measuring structures are repeated at multiple locations in the imaging field to capture the dependence of aberrations on the field position. Wafers are printed using the aberration test mask. Aberrations manifest themselves as shifts between features of the test structures. The shifts are measured by overlay metrology and aberrations are extracted from the measurements (see H. Nomura et al., "Higher order aberration measurement with printed patterns under extremely reduced σ illumination," Proc. SPIE Vol. 3679, p. 358-367, SPIE, Bellingham, Wash., 1999; "New phase shift gratings for measuring aberrations," Proc. SPIE Vol. 4346, p. 25-35, 2001; J. P. Kirk et al., "Application of blazed gratings for determination of equivalent primary azimuthal aberrations," Proc. SPIE Vol. 3679, p. 70-76, 1999).

Chromatic Aberrations

In the preferred embodiment, chromatic aberrations are measured at 252 by perturbing the wavelength of the laser light source, such as an ArF excimer laser, by a small amount, such as a few picometers, and repeating the aberration measurement. Within the bandwidth of the light source (full-width-half-max=0.2-0.6 picometers), the aberrations change linearly with wavelength perturbations. The most notable change occurs in the $4^{th}$ Zernike term, which is the focus term (see M. Terry et al., "Behavior of lens aberrations as a function of wavelength on KrF and ArF lithography scanners," Proc. SPIE Vol. 4346, p. 15-24, 2001). Therefore, chromatic aberrations can be described as smearing of the focal point in the axial direction (see P. Dirksen et al., "Determination of resist parameters using the extended Nijboer-Zernike theory," Proc. SPIE Vol. 5377, Article 13, SPIE, Bellingham, 2004).

Pupil Illumination

The pupil illumination, $((x_{pupil},y_{pupil},x_{field},y_{field})$, or equivalently $I(k_\perp^{(i)},r_\perp)$, is measured as a function of position in the lens pupil and position in the field at 254 (FIG. 4). In the preferred embodiment of 254, the pupil of the illuminator of the lithography equipment is imaged onto a detector or detector array. The pupil metrology system can be built into the lithography equipment (see M. van der Kerkof et al., Proc. SPIE Vol. 5377, Article 212, SPIE, Bellingham, Wash. 2004) or provided as temporary test equipment.

Alternatively, the pupil illumination can be extracted at 254 by: placing a special test jig in the mask stage; printing and developing wafers at various exposure doses; capturing images of the resulting resist patterns; and processing the images to obtain the pupil illumination, $I(x_{pupil}, y_{pupil}, x_{field}, y_{field})$ (see U.S. Pat. No. 6,356,345 to McArthur et al.).

In another alternative embodiment of 254, a test mask with multiple pinholes in a chrome background is formed. The holes are large enough so that they do not perturb the angular pattern significantly due to diffraction. For example, the holes are 3 micrometers in diameter (1×, wafer scale) for 193 nm lithography equipment. The holes are spaced about 1 mm apart in the field. The wafer stage, mask stage, or both are moved axially so that the image of the pinhole is as far out of focus as the stages allow, or the diameter of the out-of-focus image is about 1 mm, whichever happens at a smaller defocus. The out-of-focus image of the pinhole is an image of the pupil illumination. The image is printed in photoresist at multiple exposure doses. Images of the receding resist edge are captured by an optical microscope or an electron microscope. The pupil illumination map $I(x_{pupil}, y_{pupil}, x_{field}, y_{field})$ is extracted from the images.

Lens Flare

Lens flare is measured at 256 (FIG. 4). In the preferred embodiment, a test mask that has an opaque area and a clear area is imaged onto the image plane. The intensity of light is measured and mapped in the image of the opaque portion of the test structure. In some test structures, the clear areas are replaced by a grating. Gratings of multiple pitches are used. The light intensity is measured by a photo-detector or detector array. Flare is computed from the intensity measurements. The test structure with an opaque area and a clear area can be holes on an opaque background or opaque pads on a clear background. All test structures are repeated at multiple locations in the field to characterize the dependence of flare to the position in the field.

In another embodiment of 256, lens flare is measured as a function of position in-the field and position in the pupil plane by printing a test mask specifically designed to measure lens flare. The test mask contains opaque pads of various sizes surrounded by a clear area or a grating. The test mask is printed on wafers at multiple exposure doses. The exposure dose required to clear the image of each opaque pad in positive photoresist is recorded [see J. P. Kirk, "Scattered light in photolithographic lenses," Proc SPIE 2197, p. 566-572, SPIE, Bellingham, Wash., 1994]. Images of the receding edge of resist patterns are captured by an optical microscope or an electron microscope. Flare is calculated from the receding-edge images, dose-to-clear measurements, and critical dimension measurements performed on patterns on the wafer.

In another alternative embodiment of 256, flare is calculated from high-order aberrations observed by an interferometer, which samples wavefront errors with a high-density in the pupil plane of the projection lens (see M. van der Kerkof et al., Proc. SPIE Vol. 5377, Article 212, SPIE, Bellingham, Wash. 2004).

Aberration measurements, chromatic aberration, pupil illumination, flare and other known lithography parameters such as wavelength and numerical aperture are combined to form a position dependent model of optical projection at step 258.

"Method of Characterizing Flare," U.S. patent application Ser. No. 10/860,853, filed on the same day as the present application, is hereby incorporated by reference and describes other embodiments relating to flare. Any of the embodiments described in that application can be used in combination with any of the embodiments described herein.

Resist Model

Test structures that repeat at multiple field locations are provided on a test mask at 260 in FIG. 4. Test structures are printed at one or more values of focus and exposure dose. The resulting test patterns on wafers are measured at 262. Critical dimensions of the patterns are measured on the mask with CD-SEM at 263. At step 265, across-wafer variation is removed from across-field variation, so that the position-dependent process model, and ultimately the mask design, is not influenced by variations of processes across-the wafer. Step 265 is explained in a section below. At step 264, geometry of the test structures including mask metrology are input to the model of the optical projection obtained at step 258 and a resist model with adjustable parameters. The adjustable parameters of the resist model are changed until the predictions of the model agree with the measurements performed at step 262 and pre-processed at step 265. The model at 264 takes into account the previously-measured values of wavefront error, chromatic aberrations, pupil illumination, and flare. The test structures used to characterize the resist model contain dense and isolated lines and spaces, line ends (breaks in the middle of lines), T-shaped, U-shaped, and cross-shaped junctions of lines, SRAM cells or other test patterns that are representative of circuitry. These patterns are provided in positive and negative polarity (opaque lines in bright background, or bright lines in opaque background). The entire collection of test structures is repeated at multiple field positions in the mask. Dimensions of the structures on the wafer are measured by CD-SEM (top-down looking electron microscope), electrical impedance of etched lines, or optical scatterometry.

Alternatively, some parameters of lithography, such as focus smear (chromatic aberration), focus, low-order aberrations such as astigmatism and coma can be derived from the wafer patterns at step 264.

Etch Model

Etch bias (the difference between FI and DI critical dimension measurements) depends on the pattern density at multiple length scales. Etch bias is measured by taking the difference of the critical dimension measurements before and after etch, at the same measurement locations.

Mask Resist Model

Equations (7a-d) can be used to describe diffusion of the reactants in the resist that is used to pattern the mask. In this case, $U(r'_\perp)$ represents the e-beam or optical dose applied to the resist by the mask writer. The contours of the developed resist are determined by applying a threshold to $U_{LATENT}(r_\perp)$ as in (7a). This captures the corner rounding that occurs in mask writing.

Mask Etch Model

Schneider et al. ["Compensation of long-range process effects on photomasks by design data correction," Proc. SPIE Vol. 5148, p. 179-188, 19th European Conference on Mask Technology for Integrated Circuits and Microcomponents; June 2003] describe fitting etch-loading of the mask by a phenomenological model. The differences in line widths caused by etch-loading is represented by a convolution of the pattern density by a point-spread-function. A mask etch model is described in Granik, "Dry etch proximity modeling in mask fabrication," Yuri Publication: Proc. SPIE Vol. 5130, p. 86-91, Photomask and Next-Generation Lithography Mask Technology X; Hiroyoshi Tanabe; Ed. (August 2003).

Embodiment B

In another embodiment (Embodiment B), schematically shown in FIG. 5, parameters of lithography and resist processes are obtained by regression from measurements performed on printed test patterns. The test patterns are similar to those used in steps 260-264 of Embodiment A. In Embodiment B, wavefront error, chromatic aberration, pupil illumination, flare and resist effects are not isolated, but measured in combination. They are obtained by a joint regression operation at step 330 (FIG. 5).

Referring to FIG. 5, metrology is performed on the mask at step 315, after the photoresist on the wafer is developed (DI, or develop inspection) at step 330, and after the wafer is etched and the resist is removed (FI, or final inspection) at step 345. The measurements are indexed as follows:

measurement$_{MASK}$(s, $x_f$, $y_f$)

measurement$_{WAFER,DI}$(s, $x_f$, $y_f$, $x_w$, $y_w$)

measurement$_{WAFER,FI}$(s, $x_f$, $y_f$, $x_w$, $y_w$)

s: a composite index that uniquely identifies the test mask; the test structure in a zone 206; the quantity that is measured, such as the width of a feature or distance between features; the metrology technique (CD-SEM, ECD, OCD, overlay). The index s does not indicate the zone or the field in which the measurement was taken.

($x_f$, $y_f$): intra-field coordinates measured from an origin in the field, for example, the center of the field or its lower-left corner. Alternatively, the index of the zone in the field can be used to label the measurement since ($x_f$, $y_f$) is uniquely determined from the zone index and structure index s.

Figure 6:
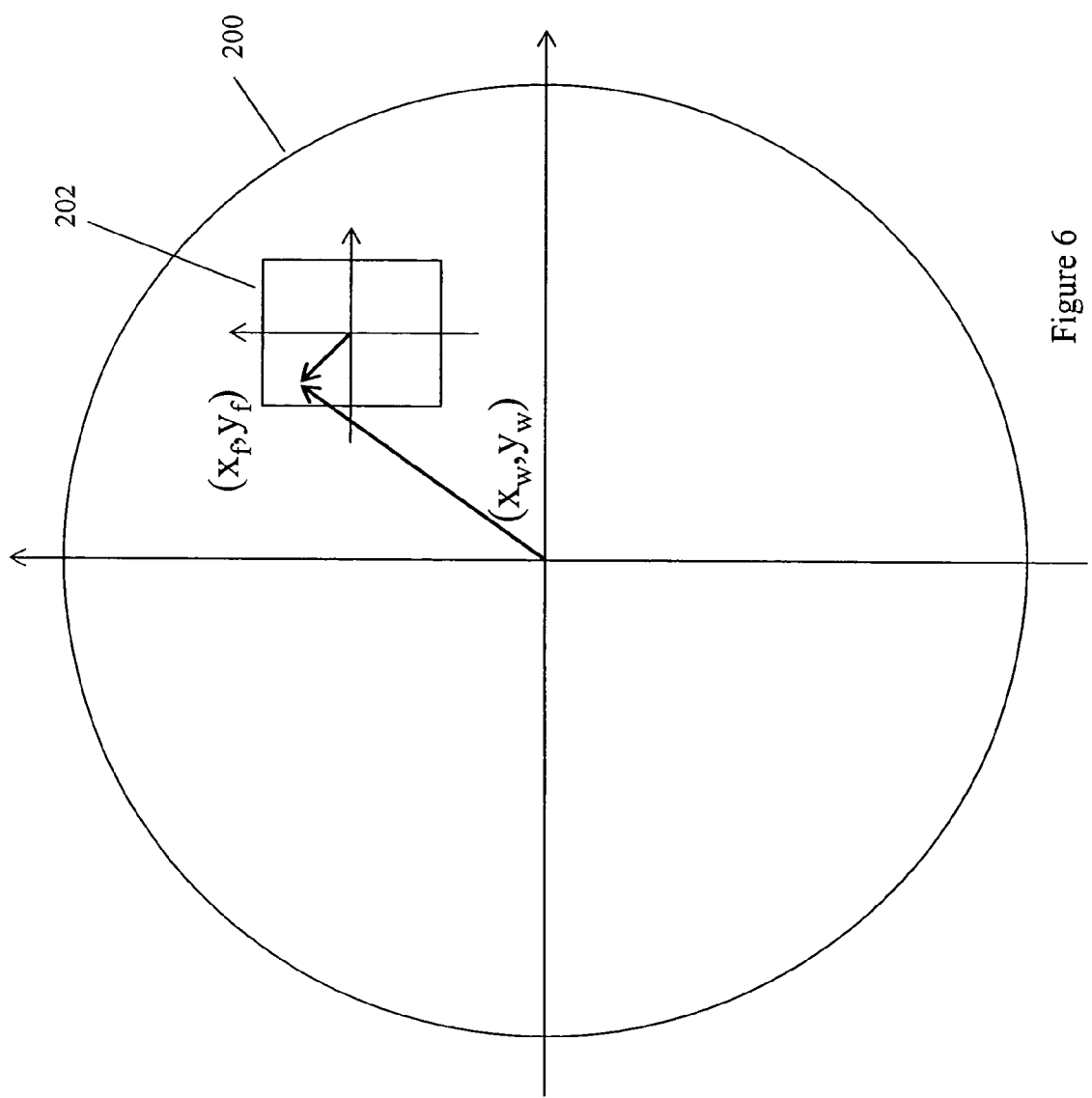
FIG. 6 illustrates the definition of field coordinates and wafer coordinates on a top view of a wafer of an embodiment.

($x_w$, $y_w$): global wafer coordinates measured from an origin on the wafer, such as the center of the wafer. Alternatively, the measurement can be labeled by a field index since ($x_w$, $y_w$) is uniquely determined from a field index and intra-field coordinates ($x_f$, $y_f$), or equivalently, from the (field, zone, structure) indices. The field-coordinates ($x_f$, $y_f$) and the wafer-coordinates ($x_w$, $y_w$) in (8) are illustrated in FIG. 6 for an arbitrary point in an imaging field 202.

It is understood that characterization of the patterning process is specific to one set of process equipment (mask writer, etcher, lithography track, lithography stepper-scanner, and wafer etcher). Therefore, the measurement is not labeled by an equipment index. At step 320, a mathematical model of the transformation of mask data into the pattern etched on the mask is obtained by fitting a model with adjustable parameters to the mask measurements at 315. Similarly, a model of optical projection and resist processes is fitted at step 335 to the wafer metrology obtained at step 330 and mask measurements at step 315. The wafer metrology is pre-processed at 334 to remove the across-wafer variation from the across field variation, as in step 265 in Embodiment A. This step is elaborated in the next section. Characterization of the wafer etch process is common to Embodiments A and B. A model is fitted to the measurements made post-etch at step 345 and measurements made on the resist pattern at step 330.

Preprocessing of the Measurements: Decomposition of Wafer, Field, Mask-Induced and Random Components of Variation The purpose of repeating structures and measurements over many points across the stepper field is to characterize variation of the patterning process across the stepper-scanner field. Across-wafer and wafer-to-wafer variations are best corrected by improving the control of these processes: spin-on and soft-bake of photoresist, exposure dose variation across the wafer, spatial uniformity of post-exposure bake and wafer etch. Across-wafer and wafer-to-wafer variations are not suitable for correction via the mask pattern since the same mask is used in a step-and-repeat fashion at each field. In order to determine across-field variations, across-wafer variations must also be determined. This is because across-wafer variations contribute to the variation across each field. Therefore, the two causes of variability need to be separated (see J. P. Cain, *Characterization of Spatial Variation in Photolithography*, M. S. thesis, University of California, Berkeley, 2002; Jason P. Cain, Costas J. Spanos, "Electrical linewidth metrology for systematic CD variation characterization and causal analysis," in *Metrology, Inspection, and Process Control for Microlithography XVII*, Proceedings of SPIE vol. 5038, 2003). The decomposition of variations is explicitly referenced at 265 in FIG. 4 and 334 in FIG. 5. The decomposition may be used at steps 262, 315, 345 and possibly at 250, 252, 254, and 256. For example, the decomposition is performed at step 330 as follows:

$$measurement_{WAFER,DI}(s, x_f, y_f, x_w, y_w) = \qquad (8)$$

$$CD_{0s} + \sum_{mn}\{A_{mn}(x_f, y_f)a_{mns}\} +$$

$$\sum_{mn}\{B_{mn}(x_w, y_w)b_{mns}\} + \sum_{m}\{C_m(x_w, y_w)c_{ms}\} +$$

$$MEEF_s \; measurement_{MASK}(s, x_f, y_f) + Res_{DI}(s, x_f, y_f, x_w, y_w)$$

The first term on the right-hand side of (8), $CD_0$, is the value of the measurement in the absence of across-field, across-wafer, and random variability.

The second term on the right-hand side of (8) represents smooth variation across the imaging field. This variation, for example, can be caused by position dependence of lens aberrations or flare. The basis functions $A_{mn}(x_f, y_f)$ are:

$$A_{mn}(x_f, y_f) = x_f^m y_{fn}, \; or$$

$$A_{mn}(x_f, y_f) = P_m(2x_f/F_x)P_n(2y_f/F_y)$$

where $P_m$ is the Legendre polynomial of degree m, and $F_x$ and $F_y$ are the dimensions of the field. Many other, basis functions are possible. The advantage of Legendre polynomials is that they provide a complete, orthogonal basis with unity weighting over the stepper-scanner field (see Abramowitz, M. and Stegun, I. A. (Eds.), Ch. 22, *Handbook of Mathematical Functions with Formulas, Graphs, and Mathematical Tables*, 9th printing. New York: Dover, pp. 771-802, 1972).

The third term on the right-hand side of (8) represents a smooth variation across the wafer. This variation, for example, can be caused by radial variation of the resist thickness or post-exposure bake temperature. The basis functions $B_{mn}(x_w, y_w)$ are:

$B_{mn}(x_w,y_w)=x_w^m y_w^n$, or

Zernike polynomial $Z_n(2x_w/D_w, 2y_w/D_w)$ where $D_w$ is the diameter of the wafer. Many other basis functions are possible. Zernike polynomials are particularly advantageous because they are complete and orthogonal on wafer with unity weighting (see Born, M. and Wolf, E., *Principles of Optics*, Ch. 9, 6th ed. New York: Pergamon Press, pp. 459-490, 1989).

The fourth term on the right-hand side of (8) indicates field-to-field exposure variations:

$C_m(x_w, y_w) = 1$ if $(x_w, y_w)$ is in field $m$ $= 0$ otherwise.

The fifth term on the right-hand side of (8) is the mask induced variability. $MEEF_s$, mask error enhancement factor, is a scalar constant specific to structure s.

The sixth term on the right-hand side of (8), $Res_{DI}(s, x_f, y_f, x_w, y_w)$ is the residual, i.e. random and systematic un-modeled variation. The coefficients MEEFs are determined by minimizing the 2-norm of the residual $Res_{DI}(s, x_f, y_f, x_w, y_w)$ in equation (8). The linear least-squares problem is solved by standard techniques of matrix calculations (see Golub, G. H. and Van Loan, C. F., *Matrix Computations*, Sect. 2.5.3 and 2.5.6, 3rd ed. Baltimore, Md.: Johns Hopkins University Press, 1996). The least squares problem is solved separately for each test structure index, s.

Figure 7A:
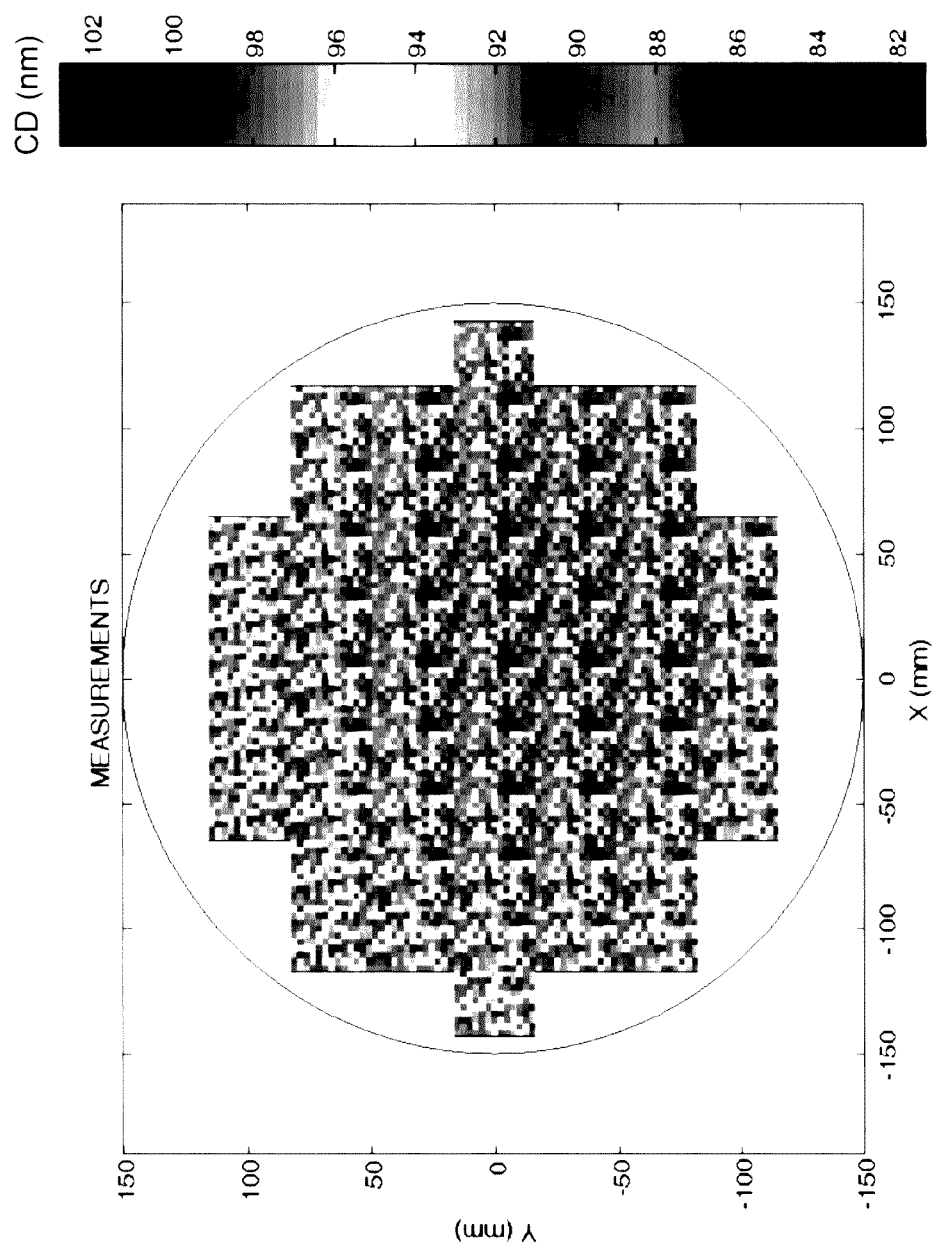
FIG. 7a shows a hypothetical critical dimension measurement made on a particular structure, at every zone, in every field of an embodiment.
Figure 7B:
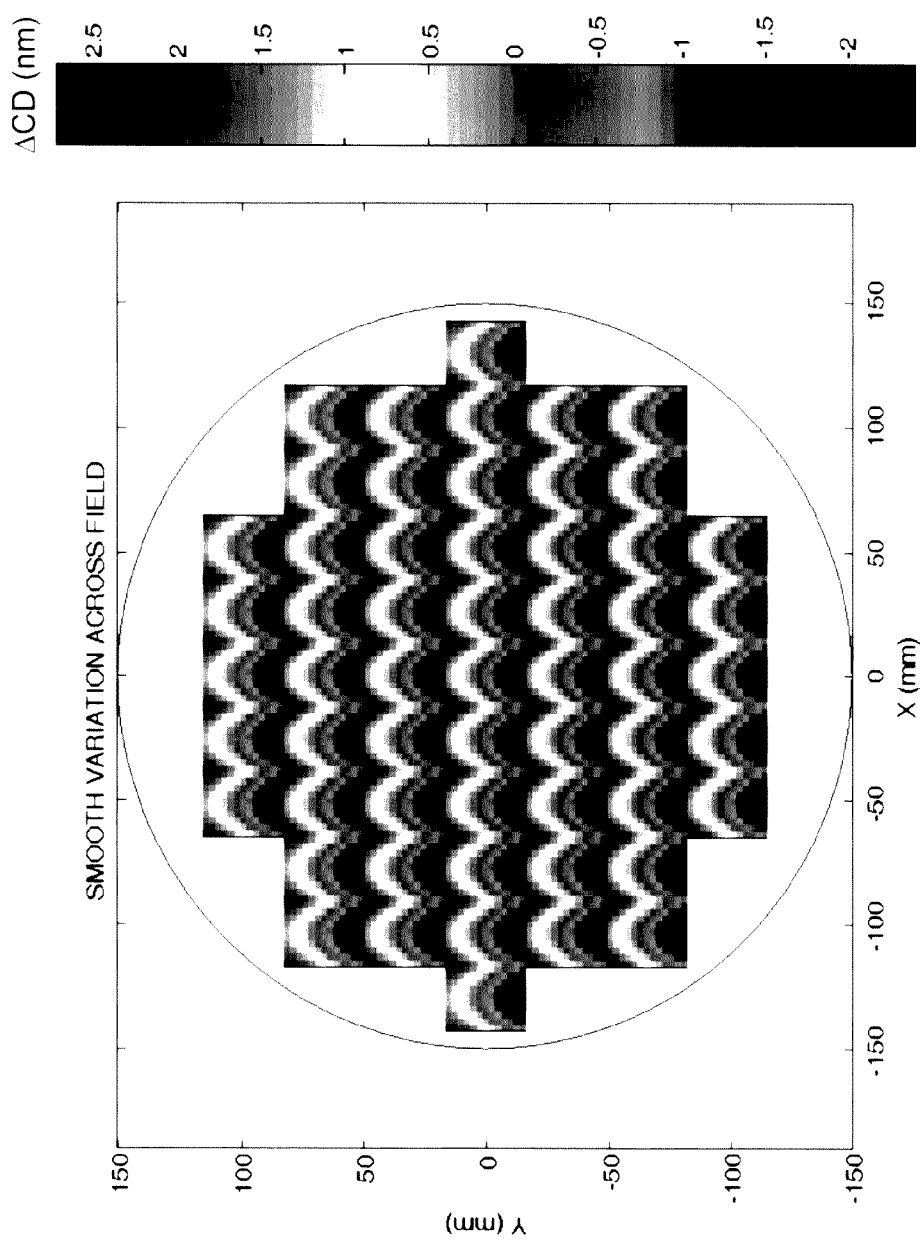
FIG. 7b shows the component of the measurement in FIG. 7a that varies smoothly with respect to field coordinates.
Figure 7C:
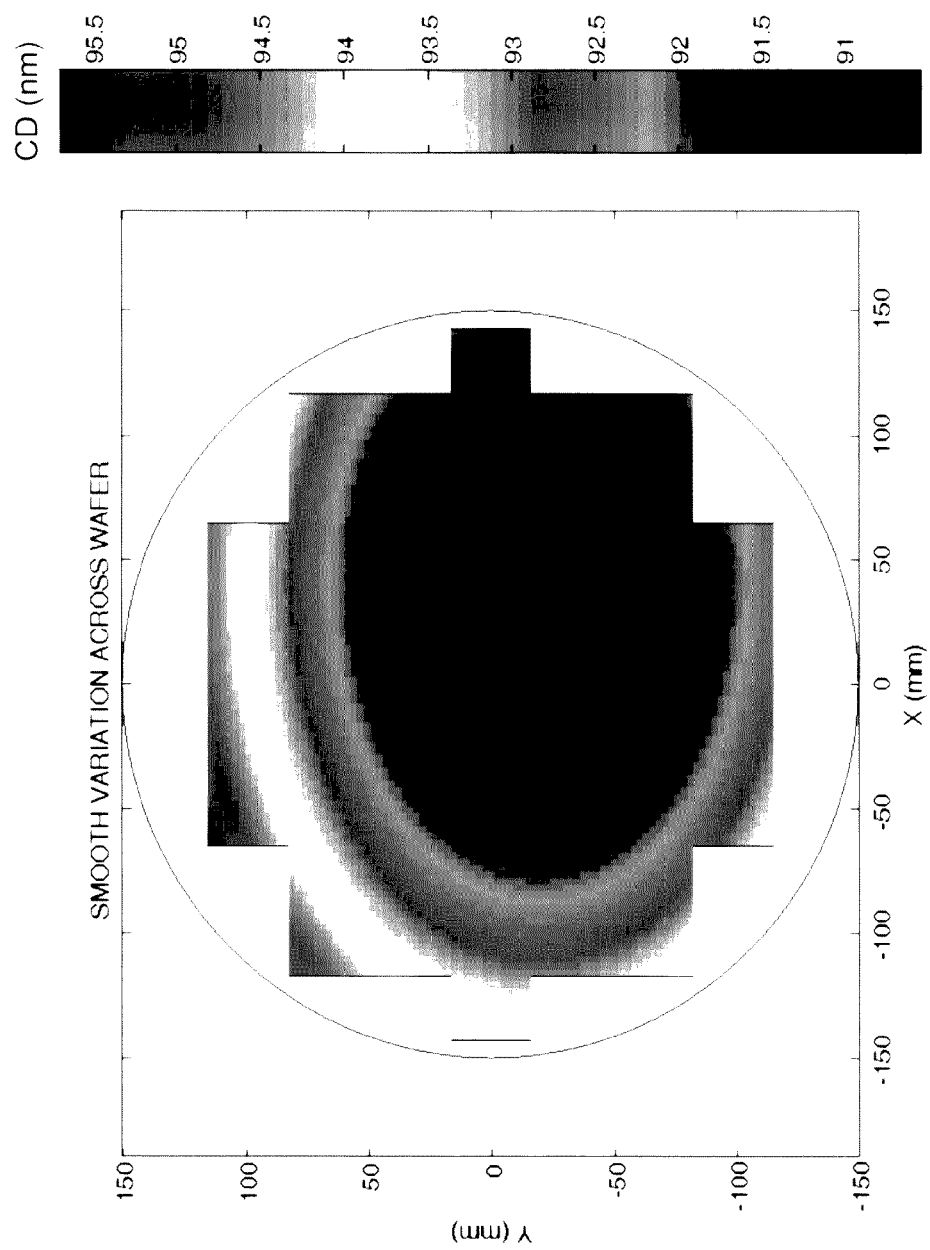
FIG. 7c shows the component of the measurement in FIG. 7a that varies smoothly with respect to wafer coordinates.
Figure 7D:
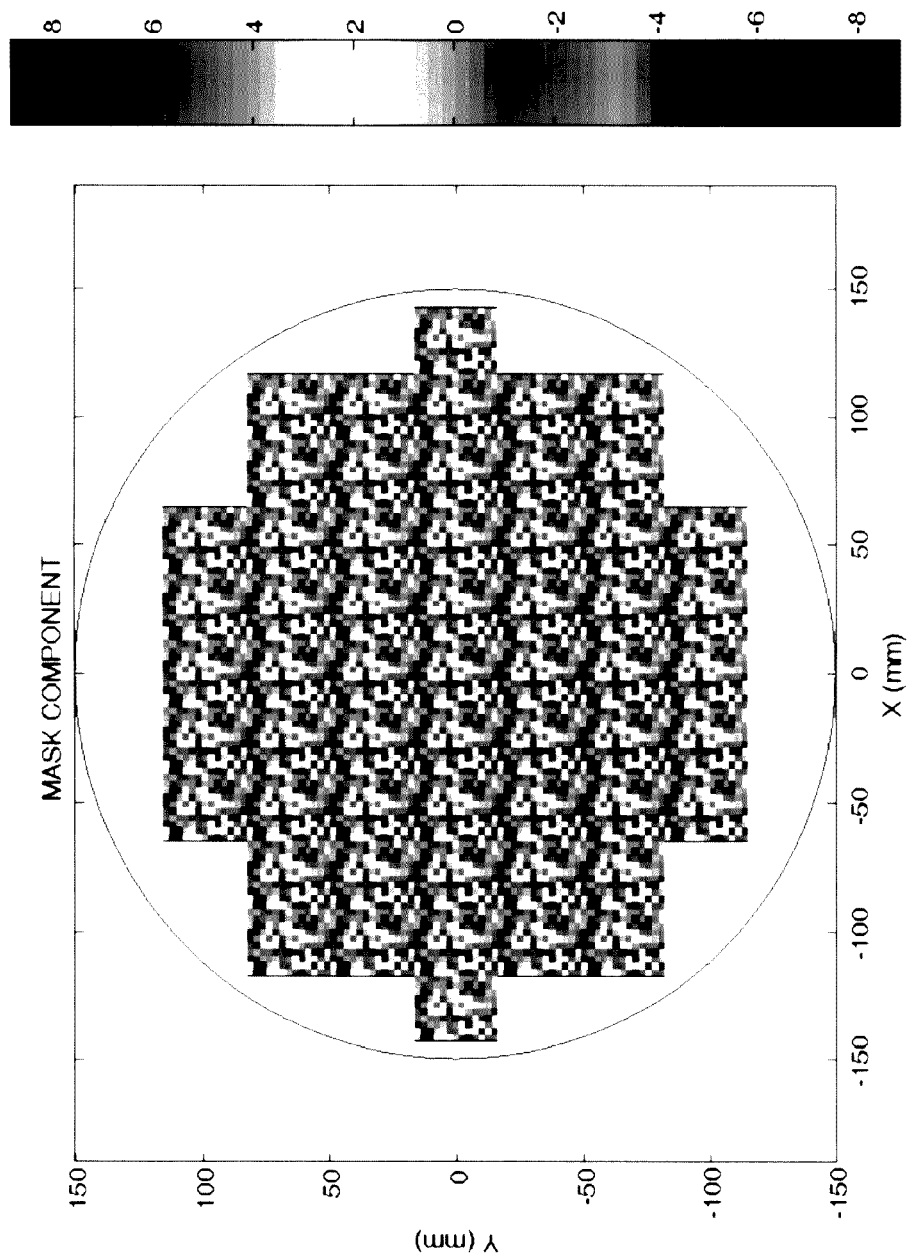
Figure 7E:
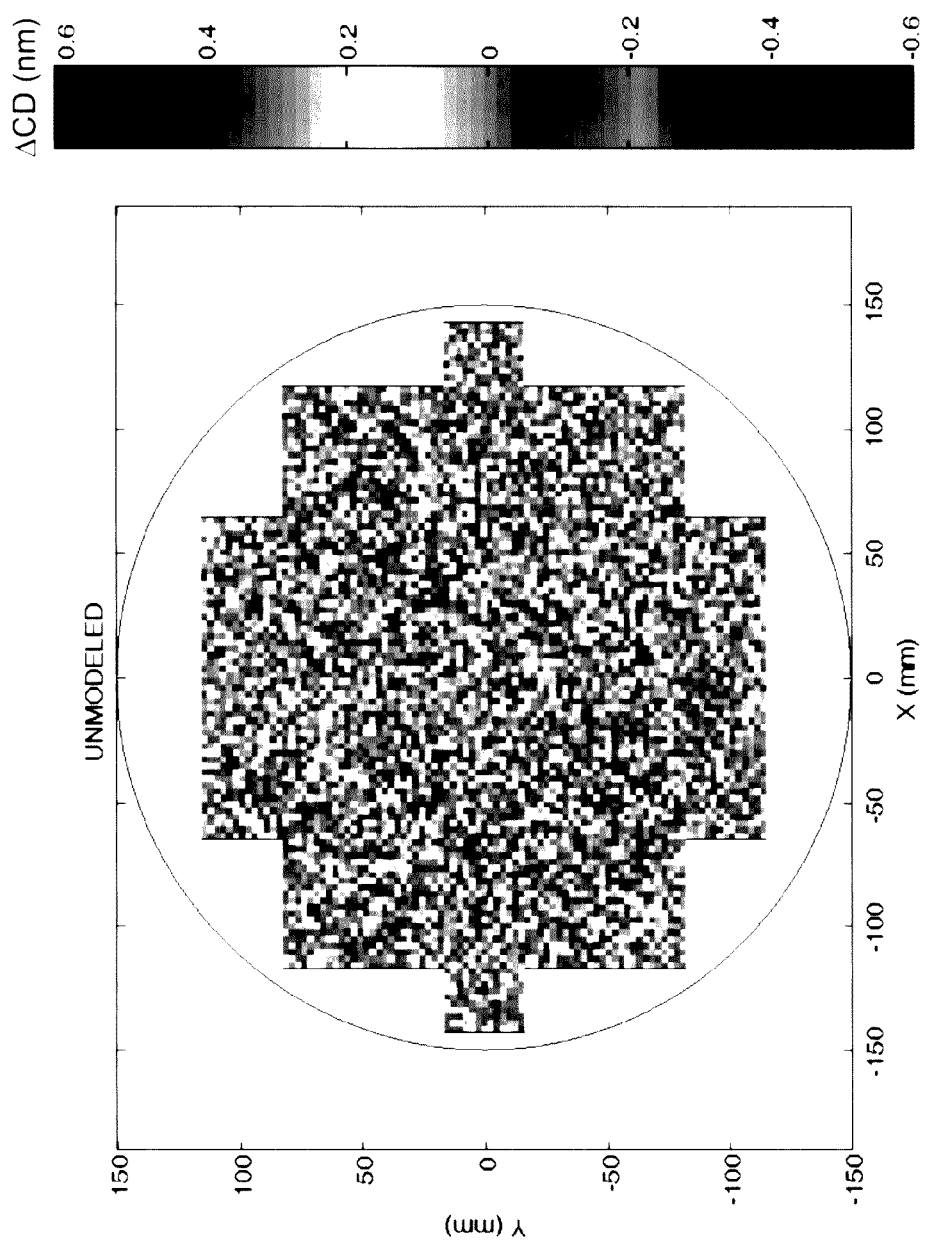
FIG. 7e shows the remainder of the measurement in FIG. 7a after the field, wafer, and mask induced variability is taken out.

FIGS. 7a-e show a numerical example of the decomposition of measurements according to Equation (8). FIG. 7a shows a hypothetical CD measurement made on a particular structure s, at every zone, in every field. FIG. 7b shows the across-field variation, second term in (8). FIG. 7c shows the sum of the first and third terms in (8), which are the nominal value and the across-wafer variation. FIG. 7d shows the mask-induced variability, the fifth term in (8). FIG. 7e shows the remainder.

Figure 8A:
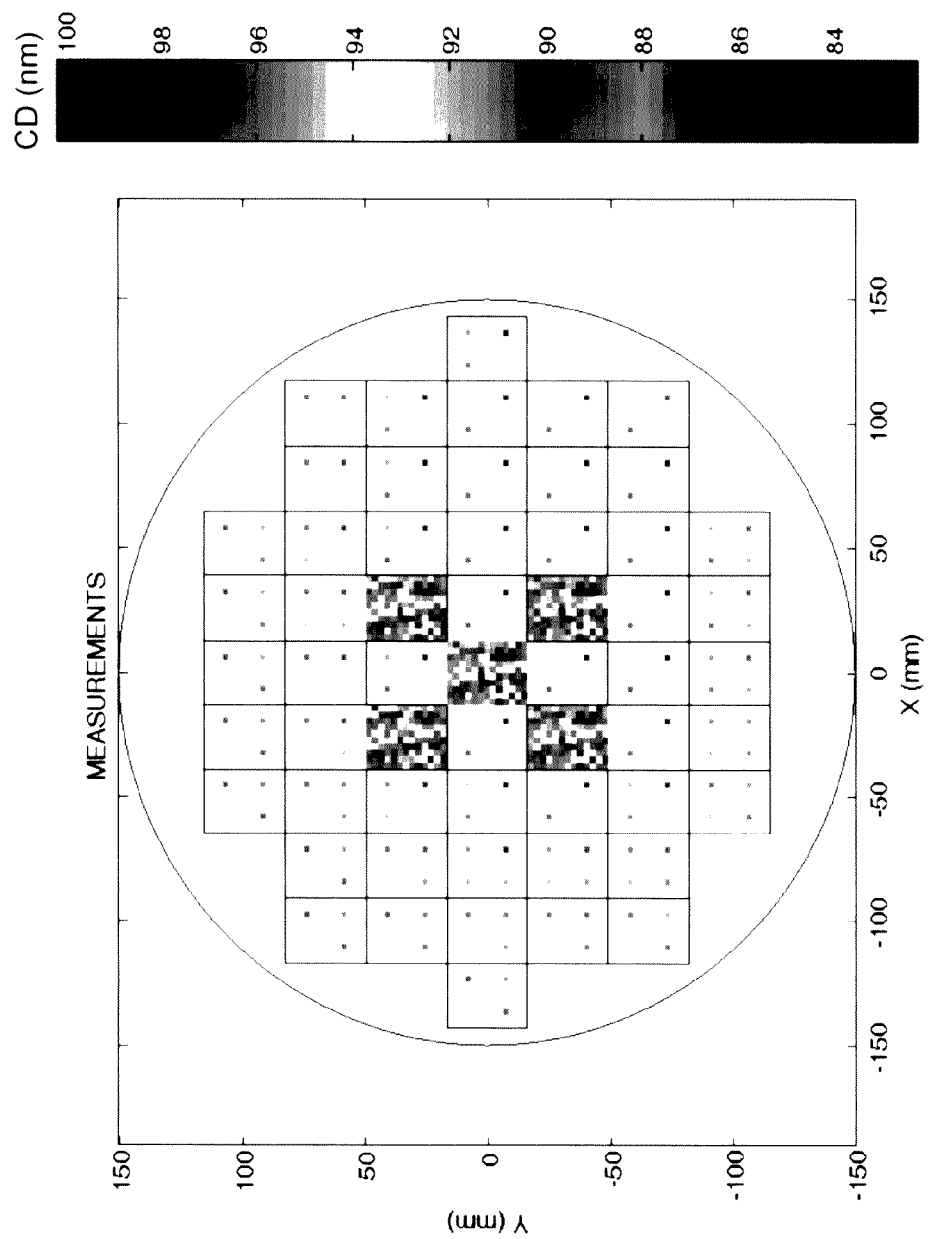
FIG. 8a shows a hypothetical critical dimension measurement of an embodiment made on a particular structure, according to a sparse sampling plan.
Figure 8B:
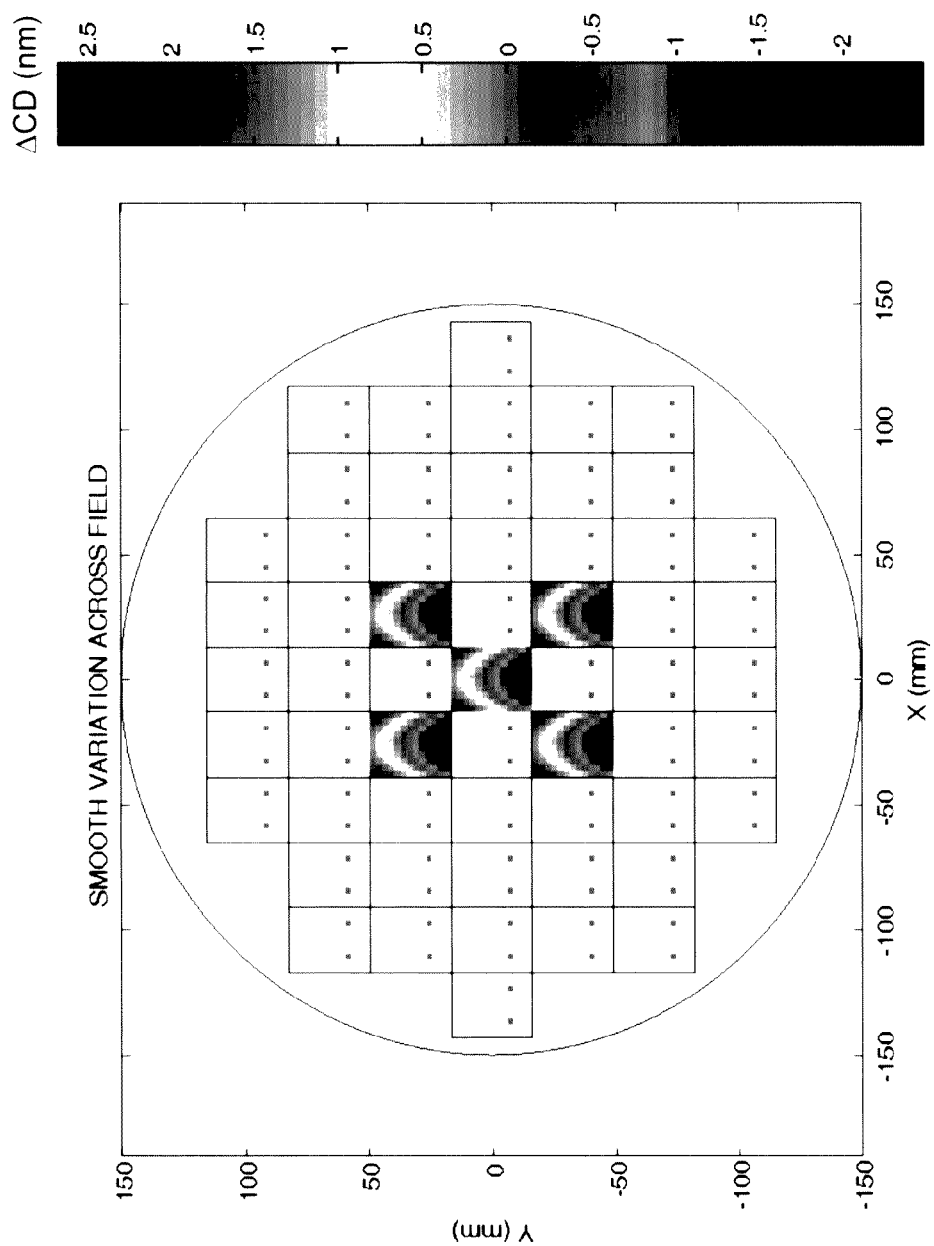
FIG. 8b shows the component of the measurement in FIG. 8a that varies smoothly with respect to field coordinates.
Figure 8C:
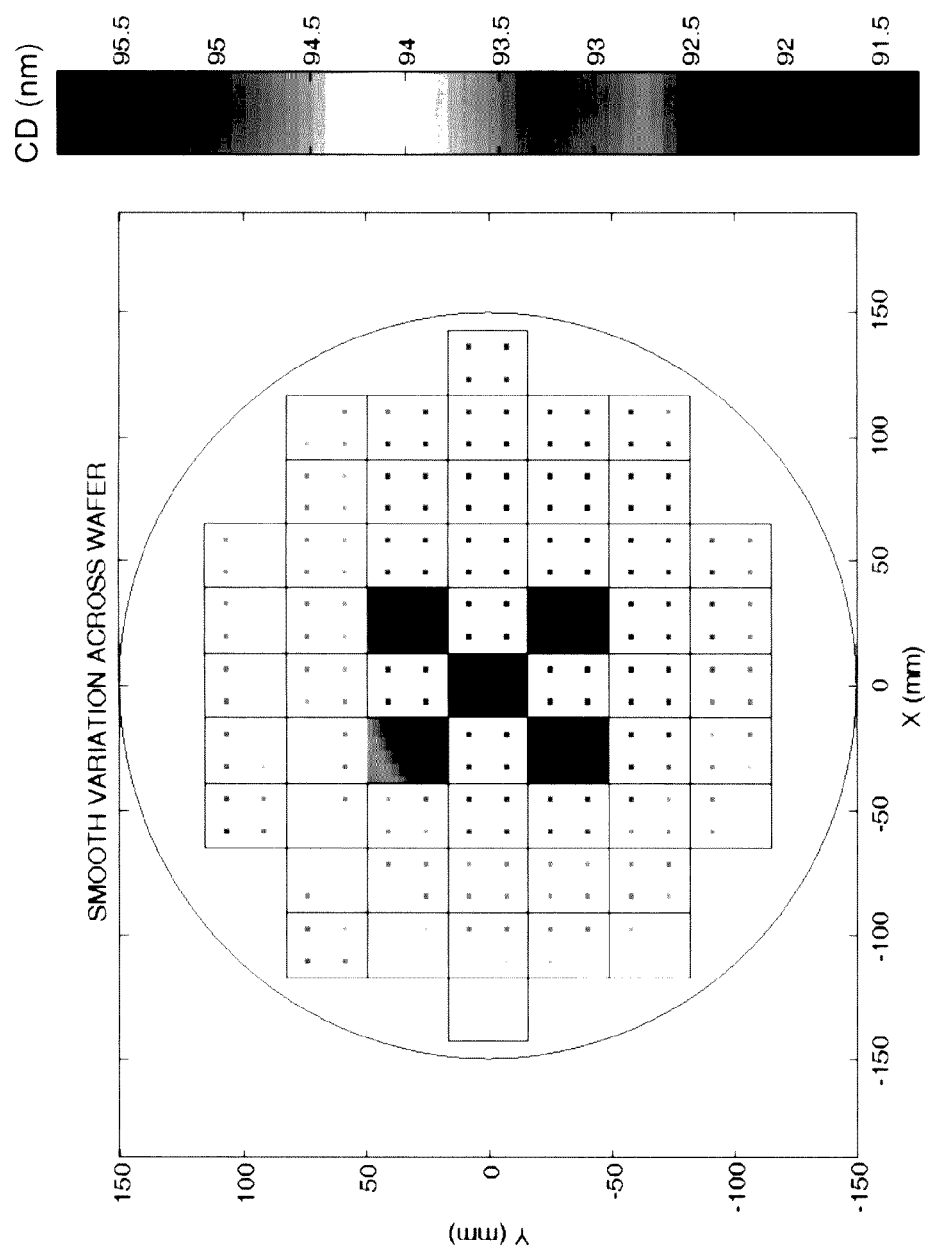
FIG. 8c shows the component of the measurement in FIG. 8a that varies smoothly with respect to wafer coordinates.
Figure 8D:
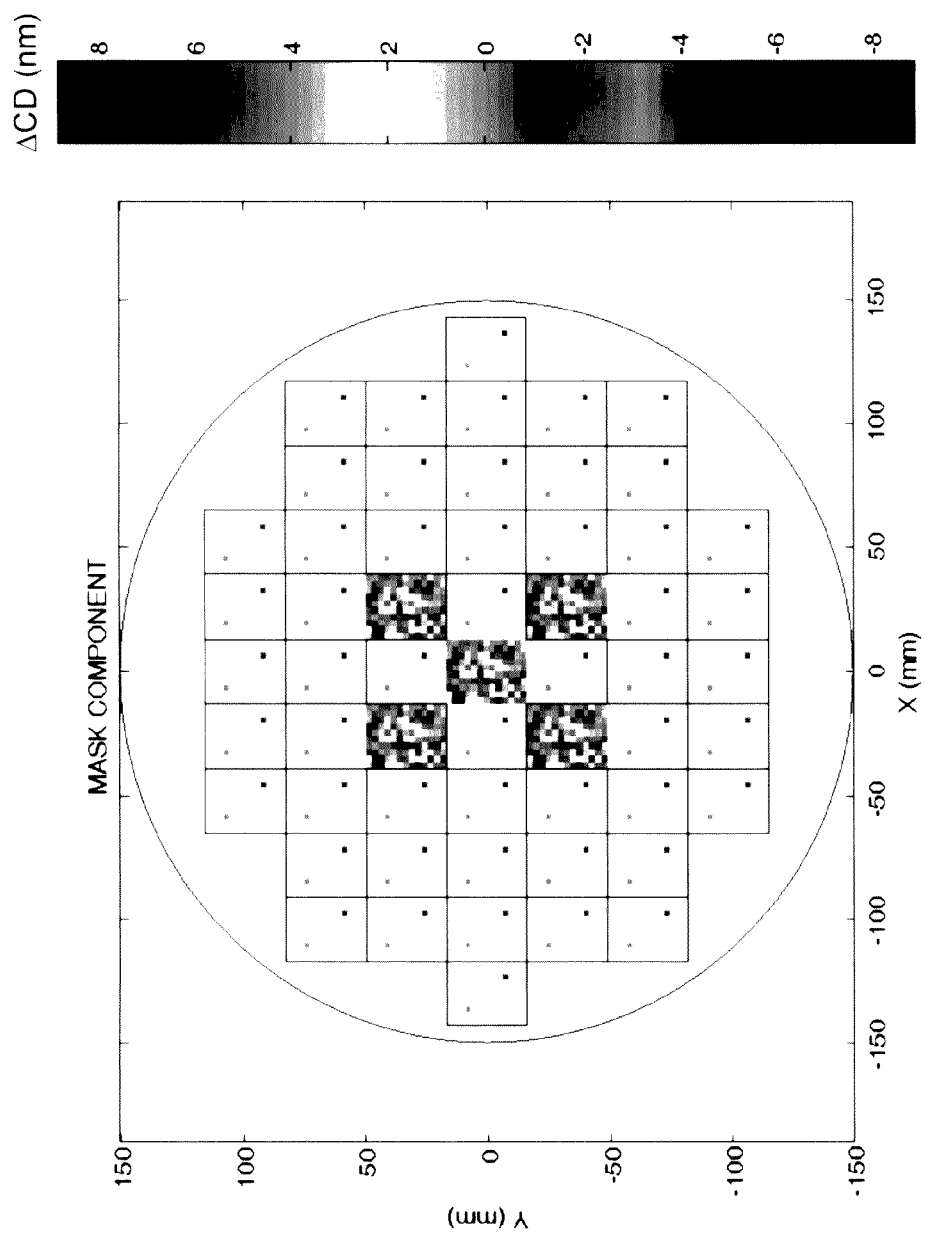
Figure 8E:
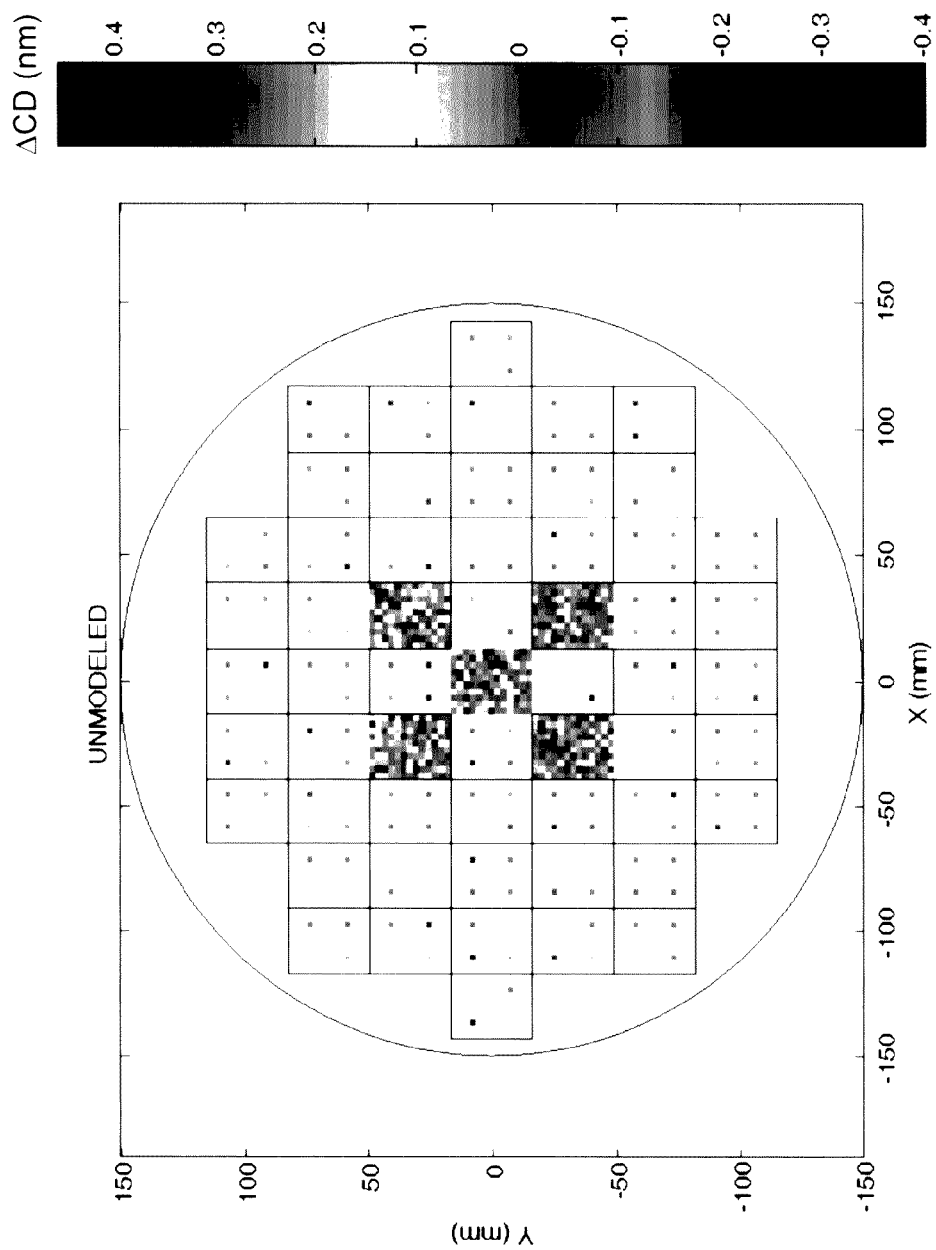
FIG. 8e shows the remainder of the measurement in FIG. 8a after the field, wafer, and mask induced variability is taken out.

The purpose of repeating the measurements at many fields across the wafer is to quantify and fingerprint the smooth variation across the wafer so that the across-wafer and across-field variations are not confused. Identifying the across-wafer variation, however, does not require sampling every zone at every field. The sparse sampling shown in FIG. 8a-e obtains the across-wafer variation by sampling 4 zones per field. (FIGS. 8a-e show the decomposition of sparsely-sampled measurements according to equation (8).) All zones 130 zones are measured in only 5 fields. FIG. 8a shows a hypothetical CD measurement made on a particular structure, according to the sparse sampling plan. FIG. 8b shows the across-field variation, second term in (8). FIG. 8c shows the sum of the first and third terms in (8), which are the nominal value and the across-wafer variation. FIG. 8d shows the mask-induced variability, the fifth term in (8). FIG. 8e shows the remainder.

Once the measurements are decomposed according to (8), across-wafer and random components (the residual) can be taken out of the measurements. This yields across-field variation of the lithography process:

$$\Delta CD_{AFLV,DI}(s, x_f, y_f) = \Sigma mn\{A_{mn}(x_f, y_f)a_{mns}\} \quad (9)$$

This would be the remaining the critical dimension variation if mask errors and across-wafer variations were eliminated. Similarly, the FI metrology (post wafer etch) can be decomposed as follows at step 345:

$$measurement_{WAFER,FI}(s, x_f, y_f, x_w, y_w) = \quad (10)$$
$$measurement_{WAFER,DI}(s, x_f, y_f, x_w, y_w) + \sum_{mn}\{A_{mn}(x_f, y_f)\alpha_{mns}\} +$$
$$\sum_{mn}\{B_{mn}(x_w, y_w)\beta_{mns}\} + Res_{FI}(s, x_f, y_f, x_w, y_w)$$

The second term on the right hand side of (10) represents variation of the etch bias across the imaging field. No such term is expected if all zones 206 have the same layout and they are uniformly spaced across the wafer. The zones are equally spaced across the wafer if the alleys between the fields, and the alleys between dies (zones) 206 within a field are of the same width. The third term on the right-hand side of (10) models across wafer variations in the etch process. The coefficients $\alpha_{mns}$ and $\beta_{mns}$ are determined by minimizing the 2-norm of the residual $Res_{FI}(s, x_f, y_f, x_w, y_w)$ in equation (10).

Embodiment B: Constructing Position-Dependent Model of the Patterning Process

After the across-field and across-wafer variations are decomposed at steps 315, 330, and 345, position-dependent models of mask making, lithography, and wafer etch processes are obtained at steps 320, 335, and 350. Each process has a previously determined mathematical model with some adjustable (unknown) parameters. Let $\xi(x_f,y_f)$ denote the array of unknown parameters, each of which can depend on the position in the field. In the lithography process, $\xi(x_f,y_f)$ includes the lens aberrations, length scales, and amplitudes of a multi-Gaussian point-spread function for flare, parameters of pupil illumination. Some entries in $\xi(x_f,y_f)$, such as parameters of chemical dynamics, do not depend on the intra-field position $(x_f,y_f)$. The process parameters $\xi(x_f,y_f)$ are obtained by solving nonlinear optimization problems at steps 320, 335, and 350. Each optimization problem involves matching the predictions of mathematical model to the across-field component of the measurements, for example, (9) in the case of the lithography process. There are two embodiments of extracting position-dependent process parameters.

Point-by-Point Extraction of the Process Parameters

In the first embodiment, a model is fitted to the across-field component $CD_{AF}$ of the measurements one zone at a time:

For the zone=1, 2, . . . , $N_{zone}$ $$\xi^*(zone) = \arg\min_{\xi} \quad (12)$$
$$\sum_{s}[CD_{0s} + \Delta CD_{AF}(s, x_f(s, zone), y_f(s, zone)) - CD_{Model}(s; \xi)]^2$$

End loop for zones $N_{zone}$ is the number of zones in a field. The underlying assumption in (12) is that the process parameters change negligibly within a zone. One array $\xi^*(j)$ represents the process parameters in the $j^{th}$ zone. An interpolating function $\xi(x_f,y_f)$ is fitted to the arrays $\{\xi^*(zone) | zone=1, 2, \ldots, N_{zone}\}$ by solving the linear least-squares problem:

$$\xi^*(zone) = \sum_{mn} \gamma_{mn} A_{mn}(x_f(zone), y_f(zone));$$ (13)

$$zone = 1, 2, \ldots, N_{zone}$$

for the coefficients $\gamma_{mn}$. The basis functions $A_{mn}(x_f, y_f)$ are as described at (8). The coordinates $(x_f(j), y_f(j))$ are the coordinates of the center of the $j^{th}$ zone. Once the linear least-squares problem (13) is solved, the process parameters anywhere in the field are calculated as:

$$\xi(x_f, y_f) = \sum_{mn} \gamma_{mn} A_{mn}(x_f, y_f)$$ (14)

The linear least-squares problem is solved separately (independently) for each entry of $\xi$, since the entries have disparate units and magnitudes, and they are not necessarily correlated. As discussed earlier, some entries of $\xi$ are not position dependent. The position-independent parameters are obtained by averaging their estimates over the zones. Different number of basis functions (polynomial degrees) can be used in the summations in (13) and (14) for each entry of $\xi$. Equation (14) interpolates the parameters $\xi^*$ of the model to any field position. Many different basis functions $A_{mn}(x_f, y_f)$ can be used in (13) and (14). Depending on the type of basis function, (14) can be spline, Fourier-basis, or piecewise-linear interpolation [see: Press, W. H.; Flannery, B. P.; Teukolsky, S. A.; and Vetterling, W. T. "Interpolation and Extrapolation." Ch. 3 in Numerical Recipes in FORTRAN: The Art of Scientific Computing, 2nd ed. Cambridge, England: Cambridge University Press, pp. 99-122, 1992]. Alternatively, parameters $\xi^*$ of the model can be interpolated in a piecewise constant manner by assigning $\xi^*(j_{zone})$ to point $(x_f, y_f)$ such that the midpoint or center of mass of $j_{zone}$ th zone is closest to $(x_f, y_f)$. Another embodiment of piecewise constant interpolation assigns the set of parameter values $\xi^*(j_{zone})$ to a rectangular subset of the image field: $\{(x_f, y_f) | \Delta x/2 < |x_f - x_{f,j_{zone}}|, \Delta y/2 < |y_f - y_{f,j_{zone}}|\}$ where $(x_{f,j_{zone}}, y_{f,j_{zone}})$ is the center-point of $j_{zone}$ th zone of the imaging field.

Joint Inversion of Model Parameters over the Entire Field

In a preferred embodiment, process parameters are described by an expansion such as (14) where the coefficients $\gamma_{mn}$ are a priori unknown. These coefficients are obtained by a nonlinear optimization problem that considers the entire field at a time:

$$\gamma^* = \arg\min_{\gamma} \sum_{zone=1}^{N_{zone}} \sum_{s} \left[ CD_{AF}(s, x_f(s, zone), y_f(s, zone)) - CD_{Model}\left(s, zone; \xi = \sum_{mn} \gamma_{mn} A_{mn}(x_f, y_f)\right) \right]^2$$ (15a)

This approach is superior to that of (12)-(13) in that there is no need to assume $\xi(x_f, y_f)$ is constant in a zone. The variation of the process within the zone and the fact that structures within a zone are at different coordinates are taken into account. Another advantage of this embodiment (joint inversion) is that parameters that do not depend on the position in the field, such as the resist blur parameters, are common to all zones and structures in the minimization problem (15a), whereas, the information that some parameters are common to all zones is not easy to exploit in the point-by-point estimation of model parameters in (12). Interpolation (14) of the model parameters $\xi$ is inherent to this approach. Once the coefficients $\gamma_{mn}$ are calculated according to (15a), the parameters $\xi$ of the model are interpolated to any field location according to (14). Many choices for the basis functions $A_{mn}(x_f, y_f)$ are available, such as powers of $x_f$ and $y_f$, orthogonal polynomials, Fourier (trigonometric) basis, and spline functions.

Obtaining the Overall Pattern Transform

Preferably, the model $CD_{Model}(s; \xi)$ in (12) describes one of the process steps. In this manner, pattern transformations for mask making $F_{MASK, \xi(x_f, y_f)}(.)$, lithography $F_{LITHO, \xi(x_f, y_f)}(.)$, and wafer etch $F_{ETCH, \xi(x_f, y_f)}(.)$ are obtained one at a time. The overall pattern transformation is the composition of the pattern transforms of individual process steps:

$$F_{\xi(x_f, y_f)}(p_{MASK}) = F_{ETCH, \xi(x_f, y_f)}(F_{LITHO, \xi_L(x_f, y_f)}(F_{MASK, \xi_M(x_f, y_f)}(p_{MASK})))$$ (15b)

Attempting to obtain the overall transform $F_{\xi(x_f, y_f)}$ in one nonlinear optimization process as in (12) is possible. Effects of sub-processes are isolated at steps 320, 335 and 350, which reduces the number of unknowns in each of the steps 320, 335 and 350. This makes the nonlinear optimization problems better constrained.

Using the Position-Dependent Model to Compensate for Patterning Distortions

Once $F_{\xi(x_f, y_f)}$ is obtained at step 266 or 360, it can be used to compensate mask data as in the prior art described in FIG. 2c and Equation (4), except, in this embodiment, the model for the patterning process depends on intra-field position:

$$p_{MASK} = \arg\min_{p} d(p_{TARGET}, F_{\xi(x_f, y_f)}(p))$$ (16)

Figure 9:
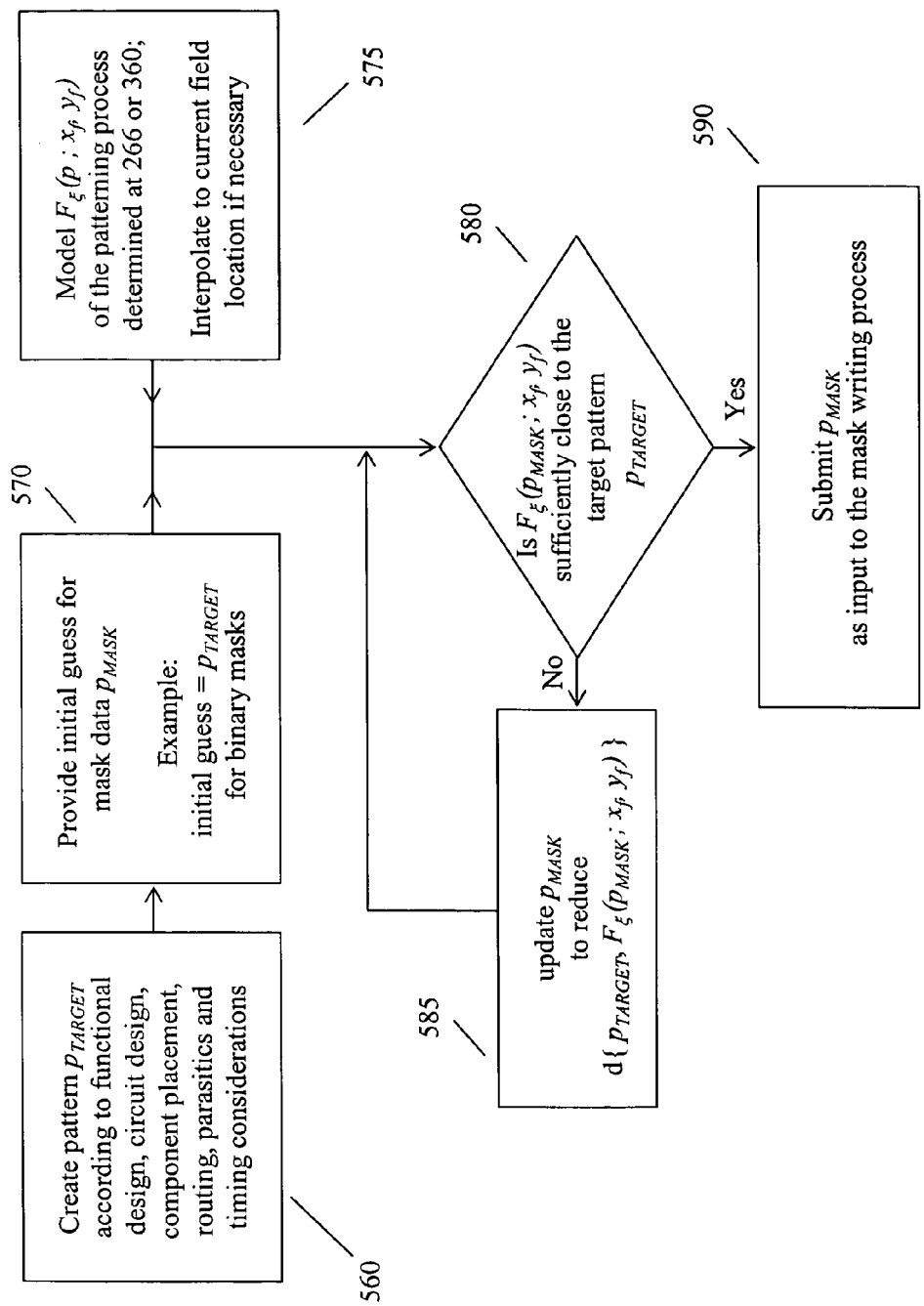
FIG. 9 is a flow chart of an embodiment for compensating mask data according to a field-position dependent transformation $F_g(p; x_f, y_f)$ of mask data p to wafer pattern.

A flowchart detailing (16) is shown in FIG. 9. The position-dependent model extracted at 266 or 360 is either interpolated to the current field position at step 575 or it is used in a piecewise constant fashion. A model is interpolated by interpolating its position dependent parameters as described in the previous sections.

Once parameters $\xi(x_f, y_f)$ are interpolated, the model at the field position $(x_f, y_f)$, is calculated from the interpolated set of parameters.

The model is invoked at step 580 in the optimization algorithm. A preferred embodiment of the metric $d(p_{TARGET}, F_{\xi(x_f, y_f)}(p))$ is:

$$d(p_{TARGET}, F_{\xi(x_f, y_f)}(p)) = \text{area}(\text{Support}(xor(p_{TARGET}, F_{\xi(x_f, y_f)}(p))))$$ (17)

Figure 10:
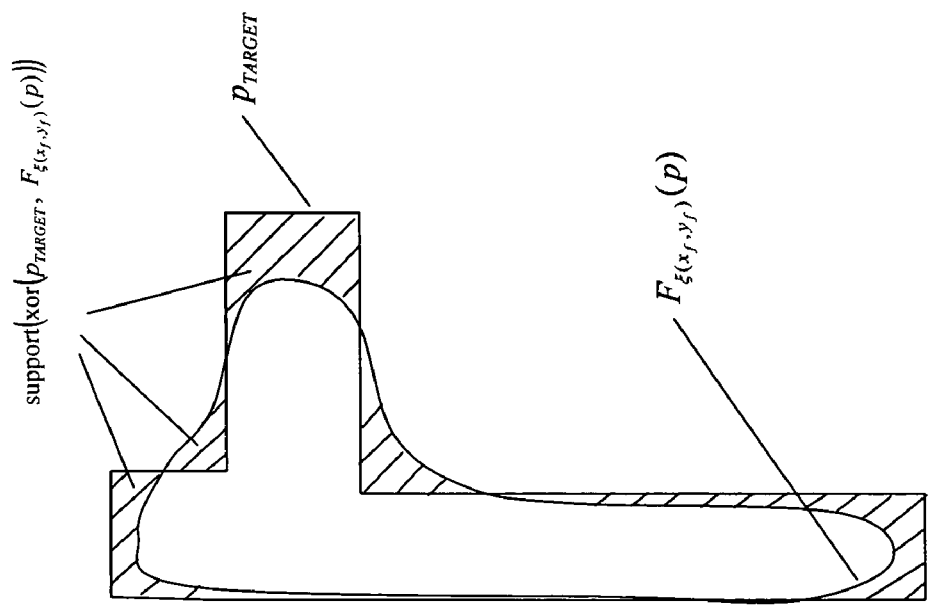
FIG. 10 is a top view of a target pattern, printed pattern predicted by a model, and the support of the exclusive-or of the target and printed patterns of an embodiment.

The logical expression $xor(a, b) = a\bar{b} + \bar{a}b$ yields 1 when $a=1$ and $b=0$, or $a=0$ and $b=1$. It yield 0 if $a=b$. The result of the xor-expression in (17) is 1 in the regions where the target pattern and the pattern predicted by model do not overlap as shown in FIG. 10. Support of a function is the subset of its domain where it takes a value other than zero. Therefore, the right-hand side of expression (17) is the area of the shaded region in FIG. 10. The goal of the optimization problem (16) is to minimize the shaded area. This goal enforces line width uniformity and proper overlay (registration). Some lens aberrations such as coma shift the image in a pattern dependent way. Coma aberration can vary across the slit of the lithography lens. This can cause uncorrected overlay errors in the prior art. The minimization in (16) is done using known techniques of nonlinear optimization such as simulated annealing (see Kirkpatrick, S.; Gelatt, C. D.; and Vecchi, M. P. "Optimization by Simulated Annealing," Science 220, 671-680, 1983), genetic algorithms (see Koza, J. R. Genetic Programming: On the Programming of Computers by Means of Natural Selection. Cambridge, Mass.: MIT Press, 1992) or the Levenberg-Marquardt algorithm (see Gill, P. R.; Murray, W.; and Wright, M. H. "The Levenberg-Marquardt Method," §4.7.3 in Practical Optimization. London: Academic Press, pp. 136-137, 1981).

Equation (16) describes selecting the mask data such that the differences between the pattern predicted by the position-dependent model and the target pattern are minimal. Robust design preferably uses the wafer pattern, $F_{\xi(x_f,y_f)}(p)$, to be insensitive to mask errors, lens aberrations, chromatic aberrations, flare, focus and exposure dose variations. Lens aberrations and chromatic aberrations are known to drift between maintenances of the lithography equipment. It is therefore preferred to synthesize a mask data the produces images that are insensitive to flare and chromatic aberrations. These goals can be added to the optimization problem of Equation (16) in the following manner:

$$p_{MASK} = \underset{p}{\arg\min} \left\{ \sum_{q=1}^{N_q} d(p_{TARGET}, F_{\xi_q(x_f,y_f)}(p)) \right\} \quad (18)$$

The summation is over all the conditions, labeled by index q, at which the target is enforced. Model $F_{\xi_q(x_f,y_f)}$, for condition q, has parameters $\xi_q(x_f, y_f)$ that describe the condition. For example, the exposure dose, focus, flare, linewidth of the illumination source can change from one condition to the next. The optimization problem (18) seeks a mask data that is the best-compromise for conditions q=1, 2, .... $N_q$.

Finally, the embodiments described above can be implemented in any suitable way using any software and/or hardware. For example, the embodiments described above can be implemented as computer-readable program code embodied in computer-readable media. Also, lithography data that is corrected based on a prediction using any of the computational models described herein can be used to manufacture a device, such as in integrated circuit.

The following patent applications are assigned to the assignee of the present invention and are hereby incorporated by reference: (1) U.S. Provisional Application No. 60/479,390, filed Jun. 18, 2003; (2) U.S. Provisional Application No. 60/480,286, filed Jun. 19, 2003; (3) "System and Method for Compensating for Aberrations in a Photolithographic Process, U.S. patent application Ser. No. 10/841,025, filed May 7, 2004 (now abandoned); (4) "System and Method for Reducing Patterning Variability in Integraced Circuit Manufacturing through Mask Layout Corrections," U.S. patent application Ser. No. 10/841,079, filed May 7, 2004; (5) "Method of Characterizing Flare," U.S. patent application Ser. No. 10/860,853, filed on the same day as the present application; and (6) "Correcting Design Data for Manufacture," U.S. patent application Ser. No. 10/860,852, filed on the same day as the present application. Any of the embodiments described in the above-listed patent applications can be used in combination with any of the embodiments described above.

The forgoing detailed description has described only a few of the many possible implementations of the present invention. For this reason, this detailed description is intended by way of illustration, and not by way of limitation. It is only the following claims, including all equivalents, that are intended to define the scope of this invention.

What is claimed is:

1. A method for predicting how lithography data is transformed into a pattern on a wafer, the method comprising:
    a) providing a computational model of a patterning process, wherein the computational model comprises (1) a position-dependent representation of lens aberrations and (2) a position-dependent representation of one or more of the following: flare, pupil illumination, chromatic aberrations, and stage error; and
    b) using the computational model to make a prediction for how the lithography data is transformed into a pattern on a wafer.

2. The method of claim 1, wherein the lithography data comprises an arbitrary two-dimensional pattern.

3. The method of claim 1, wherein representations of one or more of: lens aberrations, flare, and pupil illumination in (a) are obtained from measurements provided by instrumentation introduced into patterning equipment.

4. The method of claim 3, wherein the lens aberration is measured by an in situ interferometer.

5. The method of claim 3, wherein the pupil illumination is measured by an in situ instrument that images a pupil of an illuminator onto an image plane and captures the image either by electronic detectors or by exposing a photoresist at the image plane.

6. The method of claim 3, wherein the flare is measured by a detector in projection equipment.

7. The method of claim 1, wherein the representations of the computational model are functions of one or more parameters, and wherein (a) comprises:
    forming test patterns in multiple places in an imaging field on a wafer;
    measuring properties of the test patterns at multiple locations in the imaging field on the wafer;
    making predictions according to (b), using the computational model, of how the lithography data of the test patterns is transformed into patterns on the wafer; and
    adjusting parameters of the computational model by minimizing difference between the measurements of the properties of the test pattern and the predictions.

8. The method of claim 1 wherein the representations of the computational model are functions of one or more parameters, and wherein (a) comprises:
    forming test patterns in multiple places in each of multiple imaging fields on a wafer;
    measuring properties of the test patterns at multiple locations in the multiple imaging fields on the wafer;
    making predictions according to (b), using the computational model, of how the lithography data of the test patterns is transformed into patterns on the wafer; and
    adjusting parameters of the computational model by minimizing difference between the measurements and the predictions,
    and the method further comprises:
    decomposing the measurements of the properties of the test patterns into across-wafer, mask-induced, and across-field components of variation; and
    adjusting parameters of the computational model so that differences between (A) the across-field component of measured values of the properties of the test pattern and (B) the predictions made according to (b) are minimized.

9. The method of claim 7 further comprising:
forming test patterns at multiple values of focus, multiple values of exposure dose of lithography, or both multiple values of focus and multiple values of exposure dose of lithography; and
adjusting parameters of the computational model so that differences between the measured properties and the predictions made according to (b) are minimized.

10. The method of claim 1, wherein the computational model is a resist model that comprises a representation of resist processes that depends on one or more parameters and (1) and/or (2) are measured in a way that is independent from the one or more parameters of the resist model.

11. The method of claim 1, wherein (1) and/or (2) are obtained by regression from measurements performed on printed test patterns.

12. The method of claim 1, wherein the computational model further comprises one or more of the following: a representation of mask making, a representation of resist dynamics, and a representation of wafer etch.

13. A method for correcting lithography data according to a position-dependent model of a patterning process, the method comprising:
(a) providing a computational model of the patterning process, wherein the computational model comprises (1) a position-dependent representation of lens aberrations and (2) a position-dependent representation of one or more of the following: flare, pupil illumination, chromatic aberrations, and stage error;
(b) using the computational model to make a prediction for how the lithography data is transformed into a pattern on a wafer; and
(c) applying corrections to the lithography data based on the prediction in (b).

14. The method of claim 13, wherein (c) comprises modifying the lithography data so as to reduce differences between a target pattern and the prediction made by the computational model according to (b).

15. The method of claim 13, wherein the lithography data comprises mask data.

16. The method of claim 13, wherein the lithography data comprises mask-less data.

17. The method of claim 13, wherein the lithography data comprises an arbitrary two-dimensional pattern.

18. The method of claim 13, wherein the computational model is interpolated to any desired field location.

19. The method of claim 13, wherein the computational model is extended to any desired field location as a piece-wise constant function.

20. The method of claim 13 further comprising:
optimizing the lithography data to minimize sensitivity of a resulting pattern to one or any combination of: a focus error, an exposure dose error, a mask defect, a lens aberration, and a time-varying parameter.

21. The method of claim 20, wherein the time-varying parameter comprises one or both of lens flare and spectral linewidth of a lithography light source.

22. The method of claim 13, wherein the computational model further comprises one or more of the following: a representation of mask making, a representation of resist dynamics, and a representation of wafer etch.

23. A method for correcting lithography data according to a position-dependent model of a patterning process, the method comprising:
(a) providing a computational model of the patterning process, wherein the computational model comprises (1) a position-dependent representation of flare, (2) a position-dependent representation of pupil illumination, or (3) both a position-dependent representation of flare and a position-dependent representation of pupil illumination;
(b) using the computational model to make a prediction for how the lithography data is transformed into a pattern on a wafer; and
(c) applying corrections to the lithography data based on the prediction in (b).

24. The method of claim 23, wherein (c) comprises modifying the lithography data so as to reduce differences between a target pattern and the prediction made by the computational model according to (b).

25. The method of claim 23, wherein the lithography data comprises mask data.

26. The method of claim 23, wherein the lithography data comprises mask-less data.

27. The method of claim 23, wherein the lithography data comprises an arbitrary two-dimensional pattern.

28. The method of claim 23, wherein the computational model is interpolated to any desired field location.

29. The method of claim 23, wherein the computational model is extended to any desired field location as a piece-wise constant function.

30. The method of claim 23 further comprising:
optimizing the lithography data to minimize sensitivity of a resulting pattern to one or any combination of: a focus error, an exposure dose error, a mask defect, a lens aberration, and a time-varying parameter.

31. The method of claim 30, wherein the time-varying parameter comprises one or both of lens flare and spectral linewidth of a lithography light source.

32. The method of claim 23, wherein the computational model further comprises one or more of the following: a representation of mask making, a representation of resist dynamics, and a representation of wafer etch.

33. A method for predicting how lithography data is transformed into a pattern on a wafer, the method comprising:
(a) providing a computational model of a patterning process, wherein the computational model comprises a representation of mask making and a representation of optical projection; and
(b) using the computational model to make a prediction for how the lithography data is transformed into a pattern on a wafer,
and wherein the representation of optical projection of the computational model is a function of one or more parameters, and wherein (a) comprises:
forming test patterns in multiple places in an imaging field a wafer;
measuring properties of the test patterns at multiple locations in the imaging field on the wafer;
making predictions according to (b), using the computational model, of how the lithography data of the test patterns is transformed into patterns on the wafer; and
adjusting parameters of the computational model by minimizing difference between the measurements and the predictions.

34. The method of claim 33, wherein the lithography data comprises an arbitrary two-dimensional pattern.

35. The method of claim 33, wherein the representation of optical projection is obtained from a measurement provided by instrumentation introduced into patterning equipment.

36. The method of claim 35, wherein the representation of optical projection accounts for lens aberration, and wherein the lens aberration is measured by an in situ interferometer.

37. The method of claim 35, wherein the representation of optical projection accounts for pupil illumination, and wherein the pupil illumination is measured by an in situ instrument that images a pupil of an illuminator onto an image plane and captures the image either by electronic detectors or by exposing a photoresist at the image plane.

38. The method of claim 35, wherein the representation of optical projection accounts for flare, and wherein the flare is measured by a detector in projection equipment.

39. The method of claim 33, wherein the representations of the computational model are functions of one or more parameters, and wherein (a) comprises:
forming test patterns in multiple places in each of multiple imaging fields on a wafer;
measuring properties of the test patterns at multiple locations in the multiple imaging fields on the wafer;
making predictions according to (b), using the computational model, of how the lithography data of the test patterns is transformed into patterns on the wafer; and
adjusting the parameters of the computational model by minimizing difference between the measurements and the predictions,
and the method further comprises:
decomposing the measurements of the properties of the test patterns into across-wafer, mask-induced, and across-field components of variation; and
adjusting parameters of the computational model so that differences between the across-field component of measured properties and the predictions made according to (b) are minimized.

40. The method of claim 33 further comprising:
forming test patterns at multiple values of focus, multiple values of exposure dose of lithography, or both multiple values of focus and multiple values of exposure dose of lithography; and
adjusting parameters of the computational model so that differences between the measured properties and the predictions made according to (b) are minimized.

41. The method of claim 33, wherein the first and second representations are measured separately from each other.

42. The method of claim 33, wherein the computational model further comprises one or more of a representation of resist dynamics and a representation of wafer etch.

43. A method for predicting how lithography data is transformed into a pattern on a wafer, the method comprising:
(a) providing a computational model of a patterning process, wherein the computational model comprises a representation of mask making and a representation of optical projection; and
(b) using the computational model to make a prediction for how the lithography data is transformed into a pattern on a wafer,
and wherein the first and second representations are obtained by regression from measurements performed on printed test patterns.

44. The method of claim 43, wherein the computational model further comprises one or more of a representation of wafer etch and a representation of resist dynamics.

45. The method of claim 43, wherein the lithography data comprises an arbitrary two-dimensional pattern.

46. A method of manufacturing a device by lithography, said method comprising:
receiving lithography data;
predicting how the lithography data is transformed into a pattern on a wafer, wherein a prediction is made using a computational model of a patterning process, and wherein the computational model comprises (1) a position-dependent representation of lens aberrations and (2) a position-dependent representation of one or more of the following: flare, pupil illumination, chromatic aberrations, and stage errors;
correcting the lithography data based on the prediction; and
manufacturing the device employing the corrected lithography data.

47. A method of manufacturing a device by lithography, said method comprising:
receiving lithography data;
predicting how the lithography data is transformed into a pattern on a wafer, wherein a prediction is made using a computational model of a patterning process, and wherein the computational model comprises (1) a position-dependent representation of flare, (2) a position-dependent representation of pupil illumination, or (3) both a position-dependent representation of flare and a position-dependent representation of pupil illumination;
correcting the lithography data based on the prediction; and
manufacturing the device employing the corrected lithography data.

48. Computer-readable media comprising computer-readable program code embodied therein, the computer-readable program code being operative when executed by a computer to predict how lithography data is transformed into a pattern on a wafer using a computational model of a patterning process, and to apply corrections to the lithography data based on predictions, wherein the computational model comprises (1) a position-dependent representation of lens aberrations and (2) a position-dependent representation of one or more of the following: flare, pupil illumination, chromatic aberrations, and stage error.

49. Computer-readable media comprising computer-readable program code embodied therein, the computer-readable program code being operative when executed by a computer to predict how lithography data is transformed into a pattern on a wafer using a computational model of a patterning process, and to apply corrections to the lithography data based on predictions, wherein the computational model comprises (1) a position-dependent representation of flare, (2) a position-dependent representation of pupil illumination, or (3) both a position-dependent representation of flare and a position-dependent representation of pupil illumination.

* * * * *